United States Patent
Tsukagoshi

(10) Patent No.: US 10,123,069 B2
(45) Date of Patent: Nov. 6, 2018

(54) RECEIVING APPARATUS, RECEIVING METHOD, AND RECEIVING DISPLAY METHOD FOR DISPLAYING IMAGES AT SPECIFIED DISPLAY POSITIONS

(71) Applicant: SATURN LICENSING LLC, New York, NY (US)

(72) Inventor: Ikuo Tsukagoshi, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 14/434,226

(22) PCT Filed: Nov. 19, 2013

(86) PCT No.: PCT/JP2013/081104
§ 371 (c)(1),
(2) Date: Apr. 8, 2015

(87) PCT Pub. No.: WO2014/080879
PCT Pub. Date: May 30, 2014

(65) Prior Publication Data
US 2015/0296248 A1    Oct. 15, 2015

(30) Foreign Application Priority Data

Nov. 26, 2012  (JP) .................. 2012-258028

(51) Int. Cl.
*H04N 21/431*    (2011.01)
*H04N 21/485*    (2011.01)
(Continued)

(52) U.S. Cl.
CPC ..... *H04N 21/4312* (2013.01); *H04N 21/2355* (2013.01); *H04N 21/2362* (2013.01);
(Continued)

(58) Field of Classification Search
CPC .............. H04N 21/4312; H04N 21/4316
See application file for complete search history.

(56) References Cited

U.S. PATENT DOCUMENTS 5,995,146 A    11/1999  Rasmussen
7,028,327 B1*  4/2006  Dougherty ......... H04N 7/17318
                                                            348/E7.071
(Continued)

FOREIGN PATENT DOCUMENTS

CN    101986707 A    3/2011
CN    102598686 A    7/2012
(Continued)

OTHER PUBLICATIONS

U.S. Appl. No. 14/764,768, filed Jul. 30, 2015, Tsukagoshi.
(Continued)

*Primary Examiner* — Hoang Vu A Nguyen Ba
(74) *Attorney, Agent, or Firm* — Oblon, McClelland, Maier & Neustadt, L.L.P.

(57) ABSTRACT

A container in a predetermined format that includes a video stream obtained by coding image data is transmitted. Display position specification information that specifies a display position of the image by the image data is inserted into a layer of the container. For example, the display position specification information is information that specifies a screen of display target. Additionally, for example, the display position specification information is information that specifies a display unit on a screen of display target. For example, information indicative of whether to change a position of the display unit on the screen of display target specified by the display position specification information or not may be inserted into a layer of the video stream.

14 Claims, 28 Drawing Sheets

(51) Int. Cl.
*H04N 21/482* (2011.01)
*H04N 21/434* (2011.01)
*H04N 21/235* (2011.01)
*H04N 21/2362* (2011.01)

(52) U.S. Cl.
CPC ......... *H04N 21/431* (2013.01); *H04N 21/434* (2013.01); *H04N 21/4316* (2013.01); *H04N 21/4345* (2013.01); *H04N 21/4821* (2013.01); *H04N 21/4858* (2013.01)

(56) References Cited

U.S. PATENT DOCUMENTS

| | | | | |
|---|---|---|---|---|
| 7,631,192 | B1 * | 12/2009 | Matsuo | H04N 5/4403 380/247 |
| 8,320,819 | B2 * | 11/2012 | Rabina | H04N 21/8586 455/3.01 |
| 2004/0201544 | A1 * | 10/2004 | Love | G06F 3/1423 345/1.1 |
| 2005/0114882 | A1 * | 5/2005 | Sakamaki | G06F 17/30879 725/29 |
| 2005/0149988 | A1 * | 7/2005 | Grannan | H04N 7/088 725/136 |
| 2005/0213946 | A1 | 9/2005 | Braun | |
| 2005/0255912 | A1 | 11/2005 | Love et al. | |
| 2006/0028393 | A1 | 2/2006 | Love et al. | |
| 2006/0028394 | A1 | 2/2006 | Love et al. | |
| 2008/0134238 | A1 * | 6/2008 | Inui | H04N 5/44543 725/38 |
| 2008/0163325 | A1 * | 7/2008 | Yamamoto | H04N 7/163 725/131 |
| 2009/0003439 | A1 | 1/2009 | Wang et al. | |
| 2009/0073255 | A1 | 3/2009 | Yamamoto et al. | |
| 2009/0115901 | A1 | 5/2009 | Winter et al. | |
| 2009/0147139 | A1 * | 6/2009 | Watanabe | H04N 5/45 348/564 |
| 2010/0031293 | A1 * | 2/2010 | Ohde | H04N 5/445 725/43 |
| 2011/0102444 | A1 * | 5/2011 | Matsumoto | H04N 1/00307 345/531 |
| 2011/0181693 | A1 * | 7/2011 | Lee | H04N 19/597 348/43 |
| 2013/0191861 | A1 | 7/2013 | Sasaki et al. | |

FOREIGN PATENT DOCUMENTS

| | | |
|---|---|---|
| EP | 0 805 591 A2 | 11/1997 |
| EP | 1 919 219 A1 | 5/2008 |
| JP | 2000-13712 A | 1/2000 |
| JP | 2000-347638 A | 12/2000 |
| JP | 2009-502067 A | 1/2009 |
| JP | 2009-118166 A | 5/2009 |
| RU | 2010 102 823 A | 8/2011 |
| WO | WO 2007/013334 A1 | 2/2007 |
| WO | WO 2011/059289 A2 | 5/2011 |
| WO | WO 2013/021643 A1 | 2/2013 |

OTHER PUBLICATIONS

Combined Written Opinion and Search Report dated Mar. 16, 2016 in Singaporean Patent Application No. 11201504103W.
International Search Report dated Feb. 18, 2014 in PCT/JP2013/081104.
Extended European Search Report dated Jun. 15, 2016 in Patent Application No. 13857246.6.
Chinese Office Action dated Sep. 22, 2017 in Chinese Patent Application No. 201380060455.6 (with English translation).
Combined Chinese Office Action and Search Report dated Mar. 26, 2018 in Chinese Patent Application No. 201380060455.6 (with English translation), 22 pages.

* cited by examiner

Screen_id Table

| Screen_id | BASIC SCREEN |
|---|---|
| Screen_id = 0 | reserved |
| Screen_id = 1 | (Forward Center) |
| Screen_id = 2 | (Forward Left) |
| Screen_id = 3 | (Forward Right) |
| Screen_id = 4 | (Side Left) |
| Screen_id = 5 | (Side Right) |
| Screen_id = 6 | (Rear Left) |
| Screen_id = 7 | (Rear Right) |
| Screen_id = 8 | (Rear Center) |

TABLE INDICATIVE OF DISPLAY TARGET SCREEN SPECIFICATION OF Stream_screen_id

| Screen_id | Stream_screen_id |
|---|---|
| 1 | 1 |
| 2 | 2 |
| 3 | 3 |
| ⋮ | ⋮ |

FIG. 13 display_window_positioning_descriptor syntax

| Syntax | No. of Bits | Format |
|---|---|---|
| display_window_positioning_descriptor() { | | |
| display_window_positioning_descriptor_tag | 8 | uimsbf |
| display_window_positioning_descriptor_length | 8 | uimsbf |
| display_unconstraint_flag | 1 | bslbf |
| reserved | 3 | '111' |
| stream_screen_id | 4 | bslbf |
| window_id | 4 | bslbf |
| rendering_model | 4 | bslbf |
| V_start_offset | 16 | uimsbf |
| V_end_offset | 16 | uimsbf |
| H_start_offset | 16 | uimsbf |
| H_end_offset | 16 | uimsbf |
| } | | |

FIG. 14 display_window_positioning descriptor semantics

| | | |
|---|---|---|
| display_window_unconstraint_flag (1bit) | | INDICATE THAT RECEIVER SIDE CAN SET DISPLAY POSITION TO POSITION OTHER THAN SPECIFIED DISPLAY POSITION AT DISPLAY. |
| | 1 | RENDERING AT DISPLAY POSITION ON RECEIVER SIDE HAS FREEDOM |
| | 0 | RENDERING AT DISPLAY POSITION ON RECEIVER SIDE IS REQUIRED TO FOLLOW INSTRUCTION BY THIS descriptor |
| stream_screen_id | (4bits) | IDENTIFIER THAT IDENTIFIES SCREEN OF DISPLAY TARGET VALUE OF screen_id FINDS POSITIONAL RELATIONSHIP BETWEEN screens. |
| | 0000 | unspecified |
| | 0001 | rendering is on the target screen identical to screen #1 |
| | 0010 | rendering is on the target screen identical to screen #2 |
| | .. | |
| window_id | (4bits) | IDENTIFIER THAT IDENTIFIES DISPLAY UNIT (WINDOW) ON SCREEN OF DISPLAY TARGET |
| | 0000 | unspecified |
| | 0001 | window #1 |
| | 0010 | window #2 |
| | .. | |
| rendering_model | (4bits) | DISPLAY RESOLUTION MODEL ON DISPLAY TARGET SCREEN |
| | 0000 | reserved |
| | 0001 | 1920(H) x 1080(V) |
| | 0010 | 3840(H) x 2160(V) |
| | 0100 | 7680(H) x 4320(V) |
| | others | reserved |
| V_start_offset | (16bits) | VERTICAL DISPLAY START POSITION OF window AT RESOLUTION COORDINATE SPECIFIED BY rendering_model |
| V_end_offset | (16bits) | VERTICAL DISPLAY END POSITION OF window AT RESOLUTION COORDINATE SPECIFIED BY rendering_model |
| H_start_offset | (16bits) | HORIZONTAL DISPLAY START POSITION OF window AT RESOLUTION COORDINATE SPECIFIED BY rendering_model |
| H_end_offset | (16bits) | HORIZONTAL DISPLAY END POSITION OF window AT RESOLUTION COORDINATE SPECIFIED BY rendering_model |

FIG. 15 a multi_windows_service_descriptor syntax

| Syntax | No. of Bits | Format |
|---|---|---|
| multi_windows_service_descriptor( ) { | | |
|    multi_windows_service_descriptor_tag | 8 | uimsbf |
|    multi_windows_service_descriptor_length | 8 | uimsbf |
|    multiple_stream_service_flag | 1 | bslbf |
|    reserved | 3 | '111' |
|    number_of_streams | 4 | bslbf |
| } | | |

FIG. 15 b multi_window_service_descriptor semantics multiple_stream_service_flag (1bit)    FLAG INDICATIVE OF MULTIPLE DELIVERY SERVICE
    1             MULTIPLE DELIVERY SERVICE
    0             NON-MULTIPLE DELIVERY SERVICE
number_of_streams   (4bits)    TOTAL COUNT OF STREAMS INVOLVING DELIVERY SERVICE
    0000       reserved
    0001       1 stream
        :
    1111       15 streams

FIG. 17 a

| Syntax | No. of Bits | Format |
|---|---|---|
| user_data_unregistered (size) { | | |
| uuid_iso_iec_11578 | 128 | uimsbf |
| for( i = 16; i < payloadSize; i++ ) | | |
| user_data_payload_byte | 8 | bslbf |
| } | | |

FIG. 17 b

| Syntax | No. of Bits | Format |
|---|---|---|
| window_attribute_data ( ) { | | |
| userdata_id | 16 | uimsbf |
| window_attribute_sei_length | 8 | bslbf |
| window_attribute_sei ( ) | | |
| } | | |

*FIG. 18*

| Syntax | No. of Bits | Format |
|---|---|---|
| window_attribute_sei( ) { | | |
| window_position_change_flag | 1 | bslbf |
| reserved | 3 | 0x7f |
| rendering_model | 4 | bslbf |
| V_start_offset | 16 | uimslbf |
| V_end_offset | 16 | uimslbf |
| H_start_offset | 16 | uimslbf |
| H_end_offset | 16 | uimslbf |
| } | | |

FIG. 19

| | | |
|---|---|---|
| window_position_change_flag (1bit) | | INDICATES CHANGE OF DISPLAY POSITION OF window |
| | 1 | DISPLAY POSITION CHANGED |
| | 0 | DISPLAY POSITION NOT CHANGED |
| rendering_model | (4bits) | DISPLAY RESOLUTION MODEL AT DISPLAY TARGET SCREEN |
| | 0000 | reserved |
| | 0001 | 1920(H) x 1080(V) |
| | 0010 | 3840(H) x 2160(V) |
| | 0100 | 7680(H) x 4320(V) |
| | others | reserved |
| V_start_offset | (16bits) | VERTICAL DISPLAY START POSITION OF window AT RESOLUTION COORDINATE SPECIFIED BY rendering_model |
| V_end_offset | (16bits) | VERTICAL DISPLAY END POSITION OF window AT RESOLUTION COORDINATE SPECIFIED BY rendering_model |
| H_start_offset | (16bits) | HORIZONTAL DISPLAY START POSITION OF window AT RESOLUTION COORDINATE SPECIFIED BY rendering_model |
| H_end_offset | (16bits) | HORIZONTAL DISPLAY END POSITION OF window AT RESOLUTION COORDINATE SPECIFIED BY rendering_model |

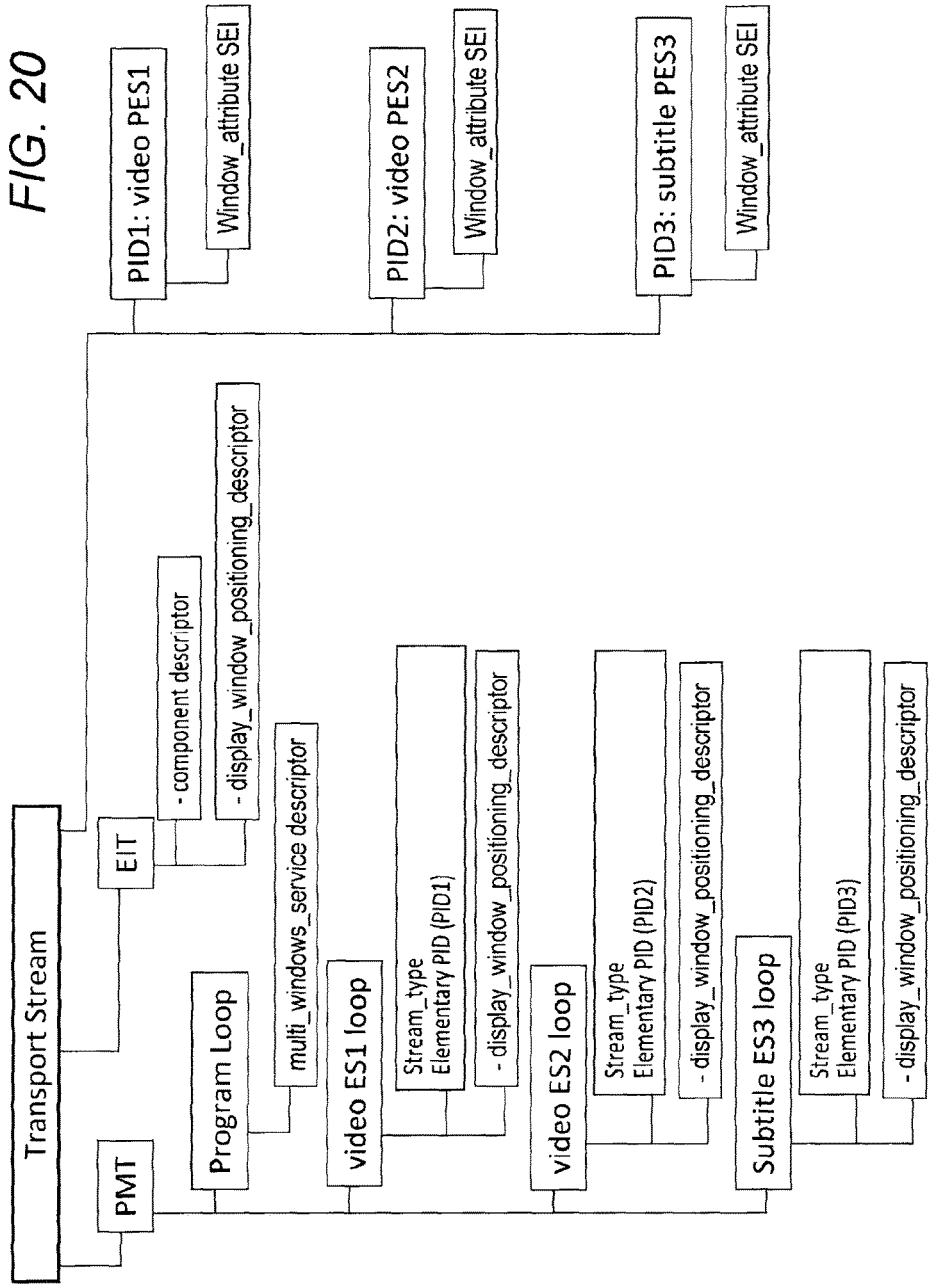

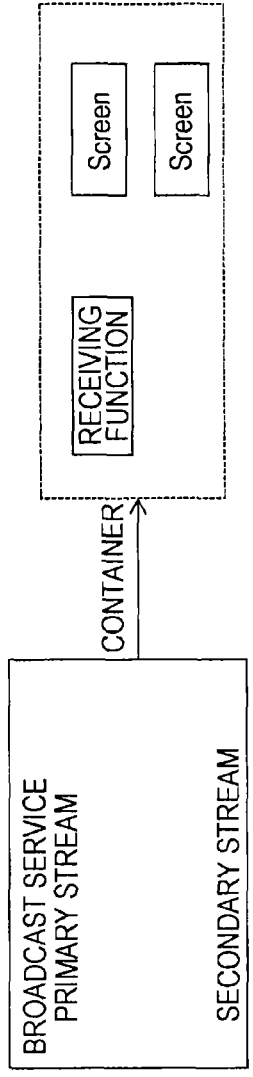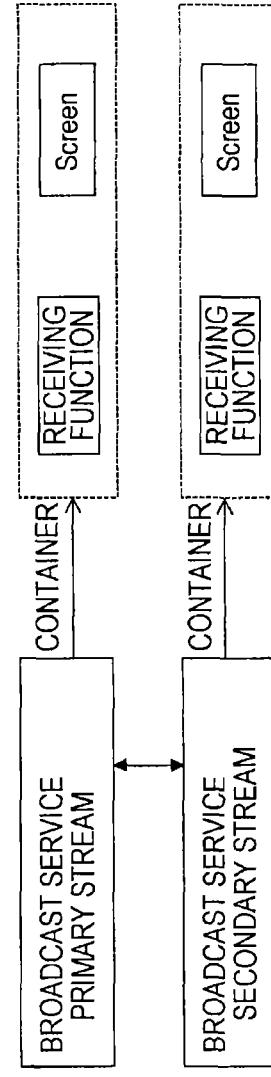
FIG. 29 a
FIG. 29 b

RECEIVING APPARATUS, RECEIVING METHOD, AND RECEIVING DISPLAY METHOD FOR DISPLAYING IMAGES AT SPECIFIED DISPLAY POSITIONS

TECHNICAL FIELD

This technique relates to a transmitting apparatus, a transmitting method, a receiving apparatus, a receiving method, and a receiving display method. In particular, this technique relates to the transmitting apparatus or a similar apparatus that allows a transmitting side to actively control a display position of an image.

BACKGROUND ART

There has been achieved or proposed a technique regarding a multi-screen display. The technique performs multiple decoding on a plurality of streams from a broadcast and a network and displays a plurality of images obtained by the multiple decoding on one display.

For example, the plurality of images is displayed in the form of a so-called Picture in Picture (PinP). This allows a user to view an image in a program of a certain channel largely displayed in a main screen while viewing an image in a program of another channel displayed small in a sub screen. Alternatively, for example, images in programs of different channels are displayed side by side on a right half and a left half of a display. This allows the user to simultaneously view the images in the programs of the two channels. For example, in the case where a display in a multi-screen is instructed in a usual display state, Patent Document 1 discloses a technique that can quickly switch the display to the multi-screen.

CITATION LIST

Patent Document

Patent Document 1: Japanese Patent Application Laid-Open No. 2000-13712

SUMMARY OF THE INVENTION

Problems to be Solved by the Invention

Streams used for the conventional multi-screen display generally are of different programs. For example, in the case of a multi-screen display in the form of the above-described PinP, streams of a source of images displayed in a main screen and streams of a source of images displayed in a subscreen are often of different programs.

That is, a function such as the following has not been provided. A transmitting side specifies a cooperation of the plurality of streams with one another and a display of the images such as the images in the identical program viewed from different angles are each displayed in the main screen and the sub screen, thus providing the user with one program.

Additionally, in both the conventional multi-screen display in PinP and multi-screen display that displays the images side by side on the left half and the right half, a way of the display depends on an implementation on a display device side; therefore, a provider side does not specify the way of the display.

Hereinafter, a spread of a display having a resolution equal to or more than a full High Definition (HD) possibly brings a broadcast that displays a plurality of images on one display to provide one program. Additionally, in this respect, there will probably be demanded on the way of the display of images, such as the transmitting side of a program actively controlling the display of images.

An object of this technique is to allow the transmitting side to actively control a display position of an image.

Solutions to Problems

A concept of this technique lies in a transmitting apparatus including:

a transmitting unit configured to transmit a container in a predetermined format, the container including a video stream obtained by coding image data; and an information inserting unit configured to insert display position specification information into a layer of the container, the display position specification information specifying a display position of an image by the image data.

The transmitting unit according to this technique transmits a container in a predetermined format. The container includes the video stream obtained by coding the image data. For example, the container may be a transport stream (MPEG-2 TS), which is employed for digital broadcast standard. Additionally, for example, the container may be in a format of MP4, which is employed for the Internet delivery or a similar purpose, or the container may be in a format other than the MP4.

The information inserting unit is configured to insert the display position specification information into a layer of the container. The display position specification information specifies a display position of the image by the image data. For example, the container is a transport stream. The information inserting unit may be configured to insert the display position specification information into a descriptor under a video elementary loop of a program map table included in the transport stream.

For example, the display position specification information may be information that specifies the screen of display target. Additionally, for example, the display position specification information may be information that specifies the display unit on the screen of display target. In this case, information indicative of a display resolution model at a display target screen may be added to the display position specification information. The display position information at a resolution coordinate specified by the display resolution model may also be added to the display position specification information.

Then, for example, the information inserting unit may be configured to further insert, into a layer of the video stream, information indicative of whether to change a position of a display unit on the display target screen specified by the display position specification information or not and, if the information indicates a change, display position information of the display unit. This allows the dynamic change in the display unit on the screen of the display target.

Thus, according to this technique, display position specification information specifying a display position of an image by the image data is inserted into a layer of the container. Accordingly, the transmitting side can actively control the display position of the image.

Note that, according to this technique, for example, information indicative of whether to permit a display at a display position other than a display position specified by the display position specification information or not may be added to the display position specification information. In this case, the transmitting side can actively control whether to permit the display at the display position other than the display position specified by this display position specification information or not.

Additionally, according to this technique, for example, a container transmitted by the transmitting unit may further include a subtitle stream obtained by coding subtitle data. The information inserting unit may be configured to further insert display position specification information into a layer of the container. The display position specification information may specify a display position of a subtitle by the subtitle data. In this case, the transmitting side can actively control the display position of the subtitle.

Additionally, according to this technique, for example, a container transmitted by the transmitting unit further includes electronic program guide information. The information inserting unit may be further configured to insert display position specification information into a layer of the container. The display position specification information specifies a display position of a program guide by the electronic program guide information. In this case, the transmitting side can actively control the display position of the program guide.

Additionally, another idea of this technique is the following receiving apparatus. The receiving apparatus includes a receiving unit. The receiving unit is configured to receive a container in a predetermined format. The container includes a video stream obtained by coding image data. Display position specification information specifies a display position of an image by the image data. The display position specification information is inserted into a layer of the container. The receiving apparatus further includes a display control unit. The display control unit is configured to control a process of the video stream to display the image by the image data at a display position specified by the display position specification information.

The receiving unit according to this technique receives a container in a predetermined format. The container includes the video stream obtained by coding the image data. The display position specification information that specifies the display position of the image by the image data is inserted into the layer of this container. For example, the container may be a transport stream (MPEG-2 TS), which is employed for digital broadcast standard, the MP4, which is employed for the Internet delivery or a similar purpose, or a format other than these. The display control unit controls the process of the video stream to display the image by the image data at the display position specified by the display position specification information.

For example, the following configuration may be employed. The receiving apparatus includes a decoding unit and a transmitting unit. The decoding unit is configured to decode the video stream to obtain non-compressed image data. The transmitting unit is configured to transmit the non-compressed image data to a display apparatus by a control by the display control unit. The display apparatus has a display target screen specified by the display position specification information. The transmitting unit is configured to insert a time code into header information at each frame of the non-compressed image data. The time code is configured to perform counting in units of frames. Additionally, for example, the receiving apparatus may further include a transmitting unit. The transmitting unit is configured to transmit the container to a display apparatus by a control by the display control unit. The display apparatus has a display target screen specified by the display position specification information.

Thus, this technique controls the process of the video stream to display the image by the image data at the display position specified by the display position specification information. Accordingly, the display position of the image is based on the control by the transmitting side, allowing displaying the image at the display position intended by the transmitting side.

Additionally, yet another idea of this technique is as follows. A receiving display method includes receiving a container in a predetermined format. The container includes a video stream obtained by coding image data. Display position specification information specifying a display position of an image by the image data is inserted into a layer of the container. The receiving display method arranges the image by the image data at: a display position specified by the display position specification information, or a display position different from the display position specified by the display position specification information, by determination based on determination information including at least the display position specification information.

EFFECTS OF THE INVENTION

According to this technique, a transmitting side can actively control a display position of an image.

BRIEF DESCRIPTION OF DRAWINGS

FIG. 13 is a drawing illustrating an exemplary configuration (Syntax) of a display window positioning descriptor (display_window_positioning descriptor) as the display position specification information.

FIG. 14 is a drawing illustrating a content (Semantics) of main information in the exemplary configuration of the display window positioning descriptor (display_window_positioning descriptor).

FIGS. 15(a) and 15(b) are drawings illustrating an exemplary configuration (Syntax) of a multi-windows service descriptor (multi_windows_service_descriptor) as delivery service information and a content (Semantics) of the main information.

FIGS. 17(a) and 17(b) are drawings illustrating exemplary configurations (Syntax) of the "window_attribute SEI message."

FIG. 18 is a drawing illustrating an exemplary configuration (Syntax) of "window_attribute_sei( )."

FIG. 19 is a drawing illustrating a content (Semantics) of main information in an exemplary configuration of the "window_attribute_sei( )."

FIG. 20 is a drawing illustrating an exemplary configuration of the transport stream TS.

FIGS. 29(a) and 29 (b) are drawings for describing a case where a plurality of service streams are supplied with a plurality of containers.

FIGS. 30(a) and 30 (b) are drawings for describing a case where a plurality of the service streams are supplied with a plurality of the containers.

MODE FOR CARRYING OUT THE INVENTION

The following describes modes for carrying out the invention (hereinafter referred to as "embodiments"). The descriptions will be given in the following order.

1. Embodiments
2. Modifications

<1. Embodiments>

[Exemplary Configurations of Image Transmission/Reception System]

Figures 1, 2:
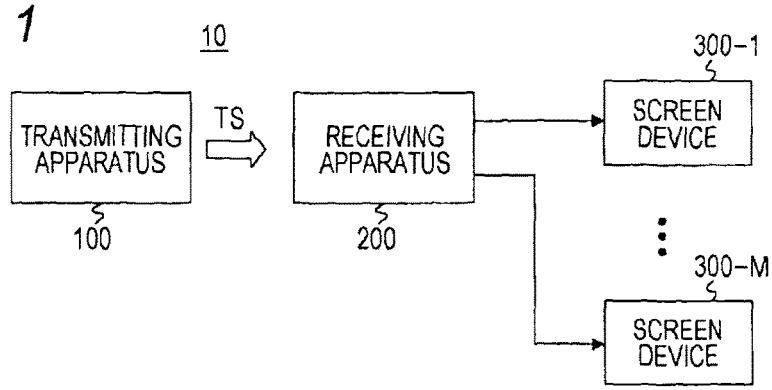
FIG. 1 is a block diagram illustrating an exemplary configuration of an image transmission/reception system as an embodiment of this invention.
FIGS. 2(*a*) and 2(*b*) are drawings illustrating a screen ID table and an exemplary table showing a correspondence relationship between a screen ID (Screen ID) and a stream screen ID (Stream_screen_ID).

FIG. 1 illustrates an exemplary configuration of an image transmission/reception system 10 as an embodiment. This image transmission/reception system 10 is configured by a transmitting apparatus 100, a receiving apparatus 200, and M pieces of screen devices 300-1 to 300-M.

The transmitting apparatus 100 is an apparatus installed at an image data transmitting side such as a broadcasting station. The transmitting apparatus 100 transmits a transport stream TS via a broadcast wave or a network. The transport stream TS includes a predetermined count of video streams each obtained by coding image data. Here, the transport stream configures a container.

Into layers of this transport stream TS, display position specification information is inserted for each video stream. The display position specification information specifies a display position of an image from the image data. This display position specification information is, for example, information that specifies a display target screen and/or a display unit (a window) on the display target screen. This display position specification information is, for example, inserted under a video elementary loop (Video ES loop) of a Program Map Table (PMT) included in the transport stream TS. Details of this display position specification information will be described later.

Here, when inserting the information specifying the display unit (the window) on the display target screen, information indicative of a display resolution model at the display target screen is added to this display position specification information. Additionally, display position information with a resolution coordinate specified by this display resolution model is added. For example, as the display resolution model, 1920 (H)*1080 (V), 3840 (H)*2160 (V), and 7680 (H)*4320 (V) are shown. Additionally, for example, the display position specification shows a coordinate at a start horizontal vertical position and a coordinate of an end horizontal vertical position of the display unit (the window).

Additionally, to this display position specification information, display permission information is added. The display permission information indicates whether to permit a display at a display position (the screen and the window) other than the display position specified by the display position specification information or not.

Assume the case where the display position specification information that is made correspond to the predetermined video stream and specifies the display unit (the window) on the display target screen is inserted into a layer of the transport stream TS. Into the layer of the predetermined video stream, position change information is inserted. The position change information indicates whether to change the position of the display unit (the window) or not. In this case, when this position change information indicates the change, the display position information with the resolution coordinate specified by the display resolution model is further inserted. The information is, for example, inserted into a user data region at a picture header or a sequence header of the video stream. The details of the information will be described later.

Additionally, the transport stream TS further includes a subtitle stream obtained by coding subtitle data. Then, into the layer of this transport stream TS, the display position specification information is further inserted. The display position specification information specifies a display position of the subtitle from the subtitle data. Additionally, the transport stream TS further includes electronic program guide information (EPG information). Then, into the layer of this transport stream TS, the display position specification information is further inserted. The display position specification information specifies a display position of a program guide from the electronic program guide information.

The receiving apparatus 200 receives the transport stream TS transmitted from the transmitting apparatus 100 via the broadcast wave or via the network. The receiving apparatus 200 performs a decoding process on the video streams, graphics streams, and the electronic program guide information, which are included in this transport stream TS. Thus, the receiving apparatus 200 obtains data for display, such as the image, graphics (including the subtitles), and the program guide. In this respect, the receiving apparatus 200 can know the display positions (the display target screen and the display unit (the window)) of the image, the graphics, and the program guide by the display position specification information corresponding to the video stream, the graphics stream, and the electronic program information, which are inserted into the layers of the transport stream TS.

The receiving apparatus 200 selectively supplies each data for display to the corresponding screen device among the screen devices 300-1 to 300-M based on the above-described display position specification information. In this respect, to correctly display the image on the display unit (the window) of the screen of the display target, the receiving apparatus 200 appropriately performs a scaling process or a similar process on the image data according to the display position information of the display unit (the window) specified by the display resolution model and vertical/horizontal pixel size information of the screen device to generate image data for display.

In this respect, the receiving apparatus 200 can know whether to change the position of the display unit (the window) or not from the position change information of the display unit (the window) inserted into the layer of the video stream. Then, when changing the position, the receiving apparatus 200 appropriately performs the scaling process or a similar process on the image data appropriately based on the display position information of the display unit (the window) added to this position change information to generate the image data for display.

Additionally, the receiving apparatus 200 decodes the subtitle streams, which are included in this transport stream TS, and obtains subtitle data for display (bit map data). In this respect, the receiving apparatus 200 can know the display target screen and the display unit (the window) where the subtitle is to be displayed from the display position specification information corresponding to the subtitle stream, which is inserted into the layer of the transport stream TS.

The receiving apparatus 200 selectively supplies the subtitle data to the corresponding screen device among the screen devices 300-1 to 300-M based on the above-described display position specification information. In this respect, to correctly display the subtitle on the display unit (the window) of the display target screen, the receiving apparatus 200 appropriately performs the scaling process or a similar process on the subtitle data according to the display position information of the display unit (the window) specified by the display resolution model and vertical/horizontal pixel size information of the screen device to generate subtitle data (bit map data) for display.

Additionally, the receiving apparatus 200 obtains program guide data (bit map data) for display based on the electronic program guide information (the EPG information), which is included in this transport stream TS. In this respect, the receiving apparatus 200 can know the display target screen and the display unit (the window) where the electron program guide is to be displayed from the display position specification information corresponding to the electronic program guide information, which is inserted into the layer of the transport stream TS.

The receiving apparatus 200 selectively supplies the program guide data to the corresponding screen device among the screen devices 300-1 to 300-M based on the above-described display position specification information. In this respect, to correctly display the program guide on the display unit (the window) of the screen of the display target, the receiving apparatus 200 appropriately performs the scaling process or a similar process on the program guide data according to the display position information of the display unit (the window) specified by the display resolution model and vertical/horizontal pixel size information of the screen device to generate program guide data (bit map data) for display.

Additionally, the receiving apparatus 200 can know whether to permit the display at the display position (the screen and the window) other than the display position specified by the display position specification information or not from the display permission information, which is added to the above-described display position information. For example, in the case where a user operation gives an instruction of displaying the image or similar data displayed on a predetermined screen or the display unit (the window) to another screen or display unit (window), when the display permission information indicates the permission, the receiving apparatus 200 performs a display transition process.

The screen devices 300-1 to 300-M each configures a basic screen arranged at a predetermined position. The screen devices 300-1 to 300-M each is formed of a liquid crystal display panel, an organic EL display panel, or a similar panel. The receiving apparatus 200 preliminarily assigns a Screen ID (Screen ID) to each basic screen to create a screen ID table (Screen_id Table).

Figure 3:
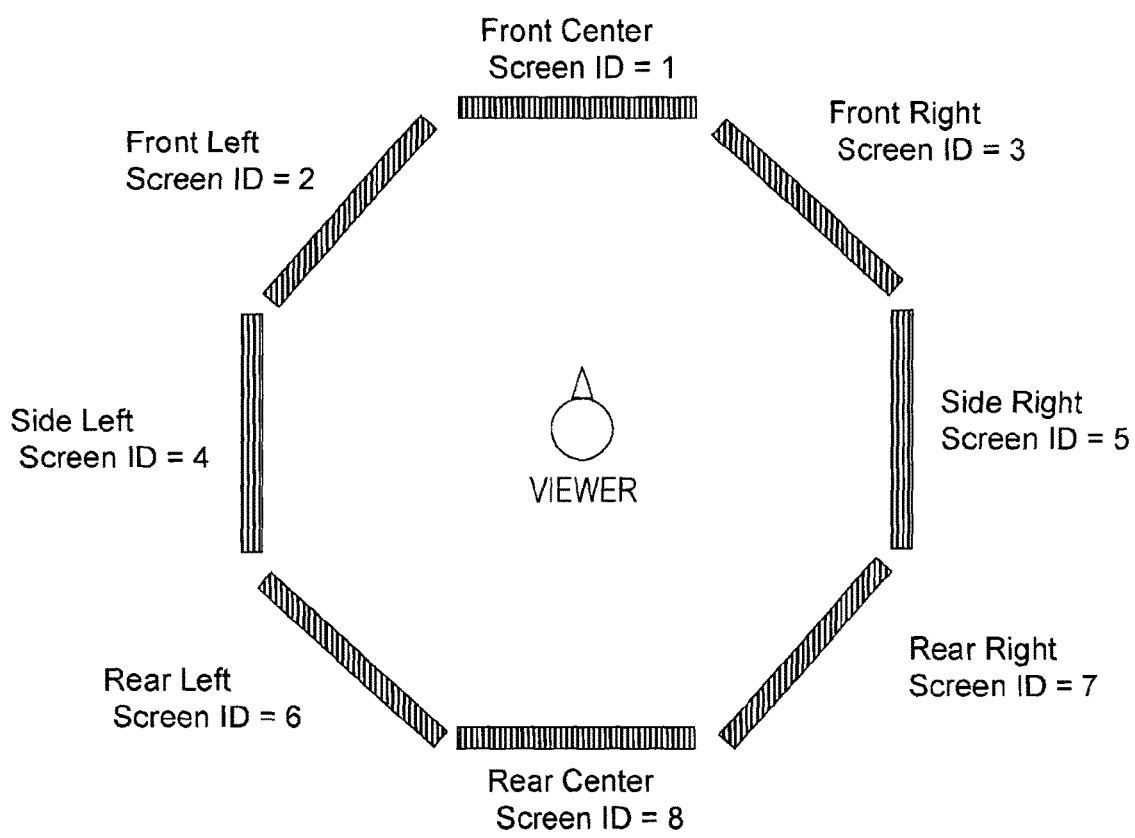
FIG. 3 is a drawing illustrating an exemplary arrangement of a basic screen configured by eight screen devices.

FIG. 2 (a) illustrates an exemplary screen ID table. For example, the basic screen arranged at a Forward Center is "Screen ID=1." Additionally, for example, the basic screen arranged at a Forward Left is "Screen ID=2." Furthermore, for example, the basic screen arranged at a Forward Right is "Screen ID=3." FIG. 3 is a drawing illustrating an exemplary arrangement of the basic screen configured by the eight screen devices.

Additionally, the receiving apparatus 200 includes a table. The table shows a correspondence relationship between a screen ID (Screen ID) and a stream screen ID (Stream_screen_ID). The stream screen ID (Stream_screen_ID) specifies the display target screen as the display position specification information inserted into the transport stream TS. FIG. 2(b) illustrates an example of the table. Based on this table, the receiving apparatus 200 selectively supplies the image data, the subtitle data, and the program guide data to each corresponding basic screen.

Figure 4:
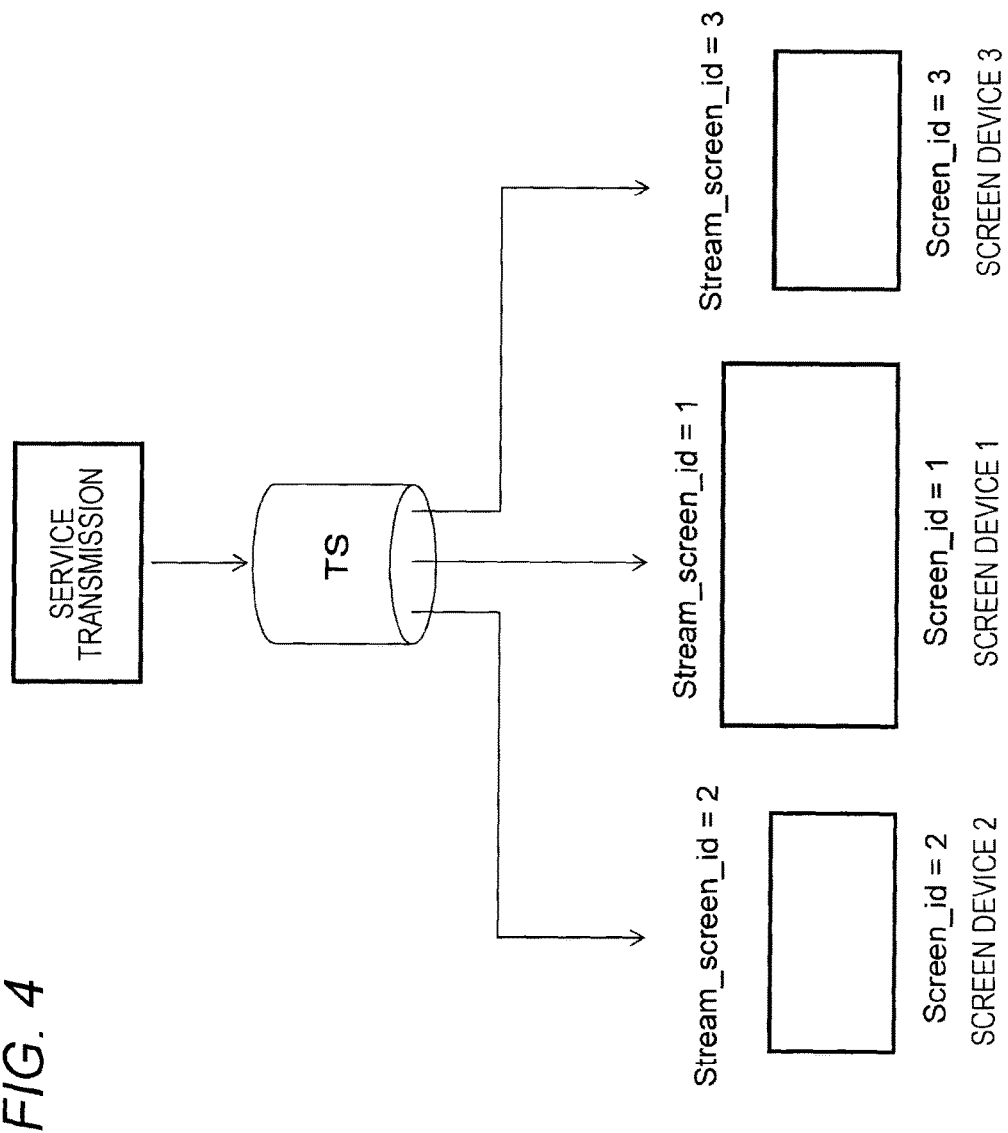
FIG. 4 is a drawing illustrating an exemplary image display in the case where streams for multiple delivery service are distributed with a single container.

FIG. 4 illustrates an exemplary image display. This example is an example where the transport stream TS includes the three video streams. In this case, corresponding to the first video stream, "Stream_screen_ID=1" is inserted into the transport stream TS as the display position specification information. Accordingly, the image data obtained by decoding this first video stream is supplied to the "screen device 1" with "Screen ID=1." Thus, the image is displayed on the screen.

Additionally, in this case, corresponding to the second video stream, "Stream_screen_ID=2" is inserted into the transport stream TS as the display position specification information. Accordingly, the image data obtained by decoding this second video stream is supplied to the "screen device 2" with "Screen ID=2." Thus, the image is displayed on the screen.

Additionally, in this case, corresponding to the third video stream, "Stream_screen_ID=3" is inserted into the transport stream TS as the display position specification information. Accordingly, the image data obtained by decoding this third video stream is supplied to the "screen device 3" with "Screen ID=3." Thus, the image is displayed on the screen.

Figure 5:
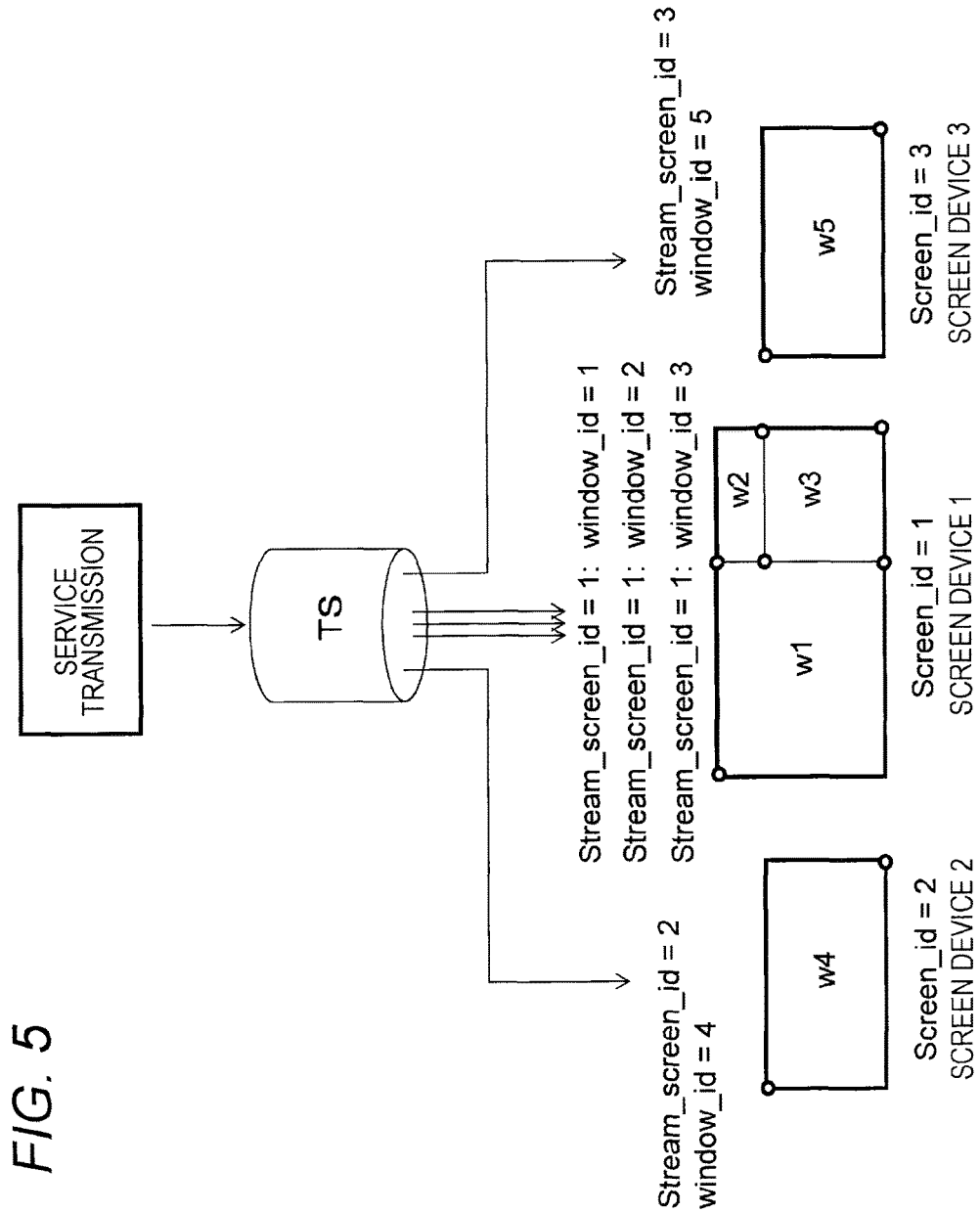
FIG. 5 is a drawing illustrating another exemplary image display in the case where the streams for multiple delivery service are distributed with the single container.

FIG. 5 illustrates another exemplary image display. This example is an example where the transport stream TS includes the five video streams. In this case, corresponding to the first video stream, "Stream_screen_ID=1" and "window_id=1" are inserted into the transport stream TS as the display position specification information. Accordingly, the image data obtained by decoding this first video stream is supplied to the "screen device 1" with "Screen ID=1." Thus, the image is displayed on the display unit (the window) "w1" of the screen.

Additionally, in this case, corresponding to the second video stream, "Stream_screen_ID=1" and "window_id=2" are inserted into the transport stream TS as the display position specification information. Accordingly, the image data obtained by decoding this second video stream is supplied to the "screen device 1" with "Screen ID=1." Thus, the image is displayed on the display unit (the window) "w2" of the screen.

Additionally, in this case, corresponding to the third video stream, "Stream_screen_ID=1" and "window_id=3" are inserted into the transport stream TS as the display position specification information. Accordingly, the image data obtained by decoding this third video stream is supplied to the "screen device 1" with "Screen ID=1." Thus, the image is displayed on the display unit (the window) "w3" of the screen.

Additionally, in this case, corresponding to the fourth video stream, "Stream_screen_ID=2" and "window_id=4" are inserted into the transport stream TS as the display position specification information. Accordingly, the image data obtained by decoding this fourth video stream is supplied to the "screen device 2" with "Screen ID=2." Thus, the image is displayed on the display unit (the window) "w4" of the screen.

Additionally, in this case, corresponding to the fifth video stream, "Stream_screen_ID=3" and "window_id=5" are inserted into the transport stream TS as the display position specification information. Accordingly, the image data obtained by decoding this fifth video stream is supplied to the "screen device 3" with "Screen ID=3." Thus, the image is displayed on the display unit (the window) "w5" of the screen.

Figure 6:
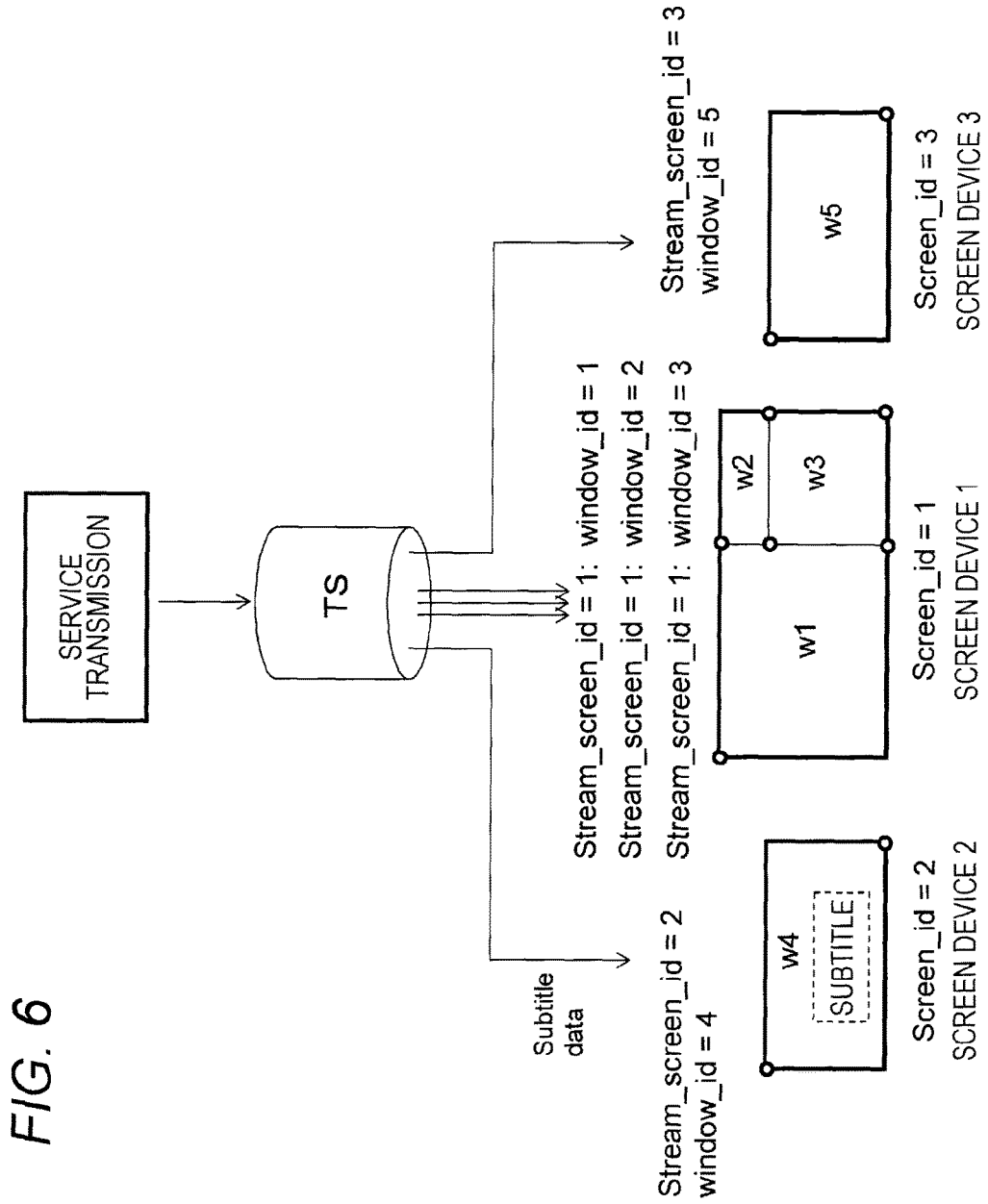
FIG. 6 is a drawing illustrating another exemplary image display in the case where the streams for multiple delivery service are distributed with the single container.

FIG. 6 illustrates yet another exemplary image display. This example is an example where the transport stream TS includes the four video streams and the one subtitle stream. Since the first to third video streams are similar to the above-described exemplary image display in FIG. 5, the description will not be further elaborated here.

In this case, corresponding to the subtitle stream, "Stream_screen_ID=2" and "window_id=4" are inserted into the transport stream TS as the display position specification information. Accordingly, the subtitle data (Subtitle data) obtained by decoding this subtitle stream is supplied to the "screen device 2" with "Screen ID=2." Thus, the subtitle is displayed on the display unit (the window) "w4" of the screen.

Additionally, in this case, corresponding to the fourth the video stream, "Stream_screen_ID=3" and "window_id=5" are inserted into the transport stream TS as the display position specification information. Accordingly, the image data obtained by decoding this fourth video stream is supplied to the "screen device 3" with "Screen ID=3." Thus, the image is displayed on the display unit (the window) "w5" of the screen.

Figure 7:
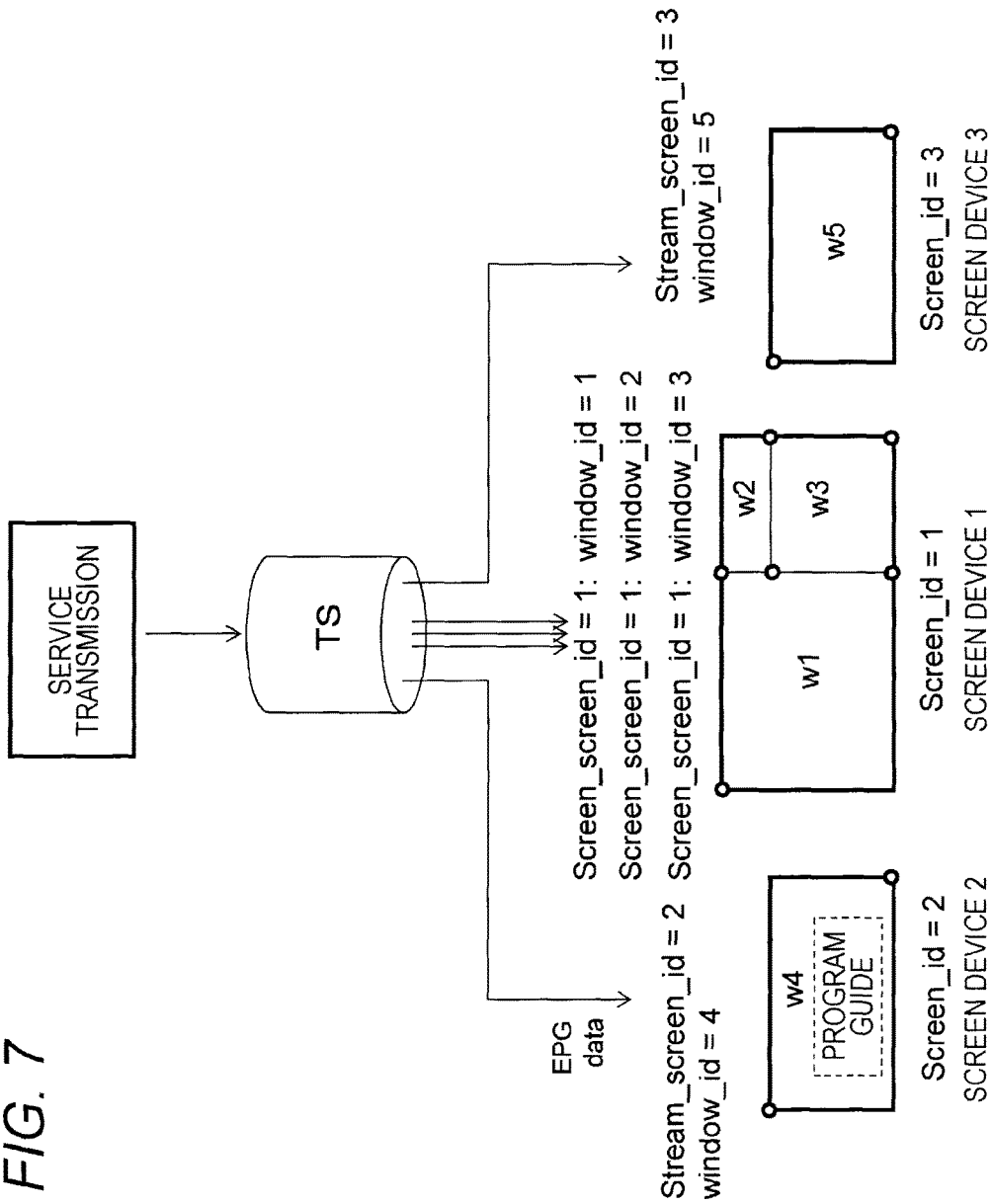
FIG. 7 is a drawing illustrating another exemplary image display in the case where the streams for multiple delivery service are distributed with the single container.

FIG. 7 illustrates different exemplary image display. This example is an example where the transport stream TS includes the four video streams and the electronic program guide information (the EPG information). Since the first to third video streams are similar to the above-described exemplary image display in FIG. 5, the description will not be further elaborated here.

In this case, corresponding to the electronic program guide information, "Stream_ screen ID=2" and "window_id=4" are inserted into the transport stream TS as the display position specification information. Accordingly, the program guide data (the EPG data) obtained from this electronic program guide information is supplied to the "screen device 2" with "Screen ID=2." Thus, the program guide is displayed on the display unit (the window) "w4" of the screen.

Additionally, in this case, corresponding to the fourth video stream, "Stream_screen_ID=3" and "window_id=5" are inserted into the transport stream TS as the display position specification information. Accordingly, the image data obtained by decoding this fourth video stream is supplied to the "screen device 3" with "Screen ID=3." Thus, the image is displayed on the display unit (the window) "w5" of the screen.

Note that if the window IDs (window_id) corresponding to the plurality of streams are the identical, the images or similar data related to each stream are displayed on the identical display unit (the window). That is, the window ID (window_id) is defined for mutual association of the streams for display.

Figure 8:
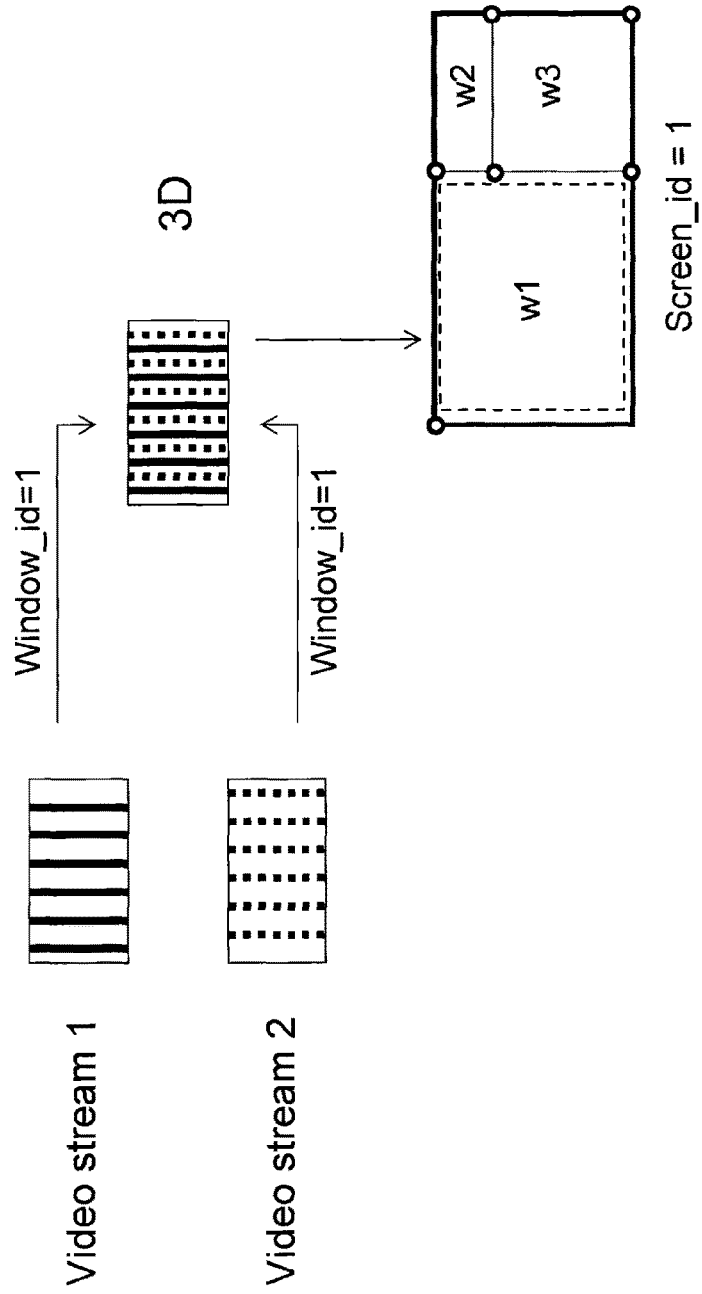
FIG. 8 is a drawing illustrating an exemplary display in the case where the streams are associated to one another for display by a window ID (window_id).

FIG. 8 illustrates an exemplary display in the case where the streams are associated to one another for display by the window ID (window_id). This example shows a case where a plurality of the video streams each formed of different view data, here, the images of the two video streams, are plurally displayed on the identical display area, that is, the identical display unit (the window) to configure a three-dimensional (3D) display.

Figure 9:
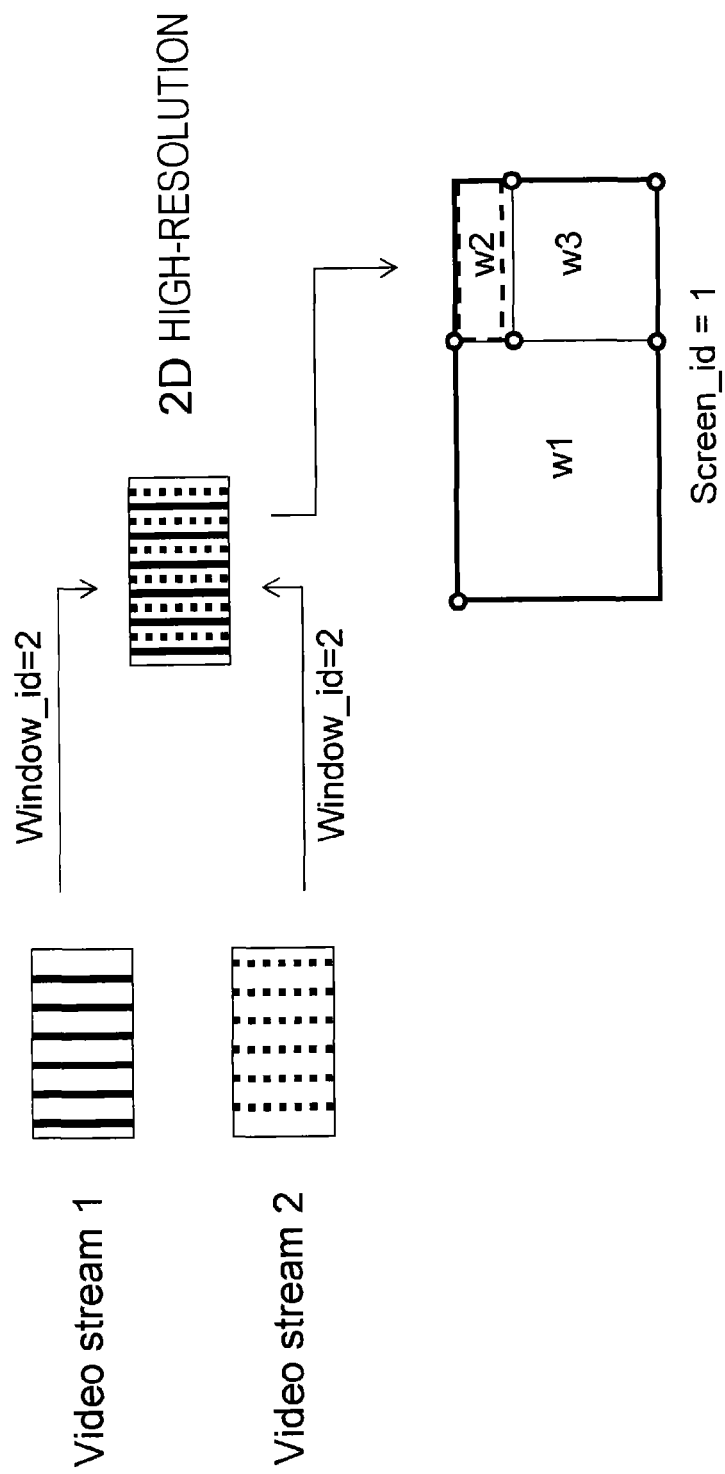
FIG. 9 is a drawing illustrating another exemplary display in the case where the streams are associated to one another for display by the window ID (window_id).

FIG. 9 illustrates another exemplary display in the case where the streams are associated to one another for display by the window ID (window_id). This example shows a case where one image is divided into a plurality of the video streams, here, two video streams and are plurally displayed on the identical display area, that is, the identical display unit (the window) to configure a high-resolution display.

Figure 10:
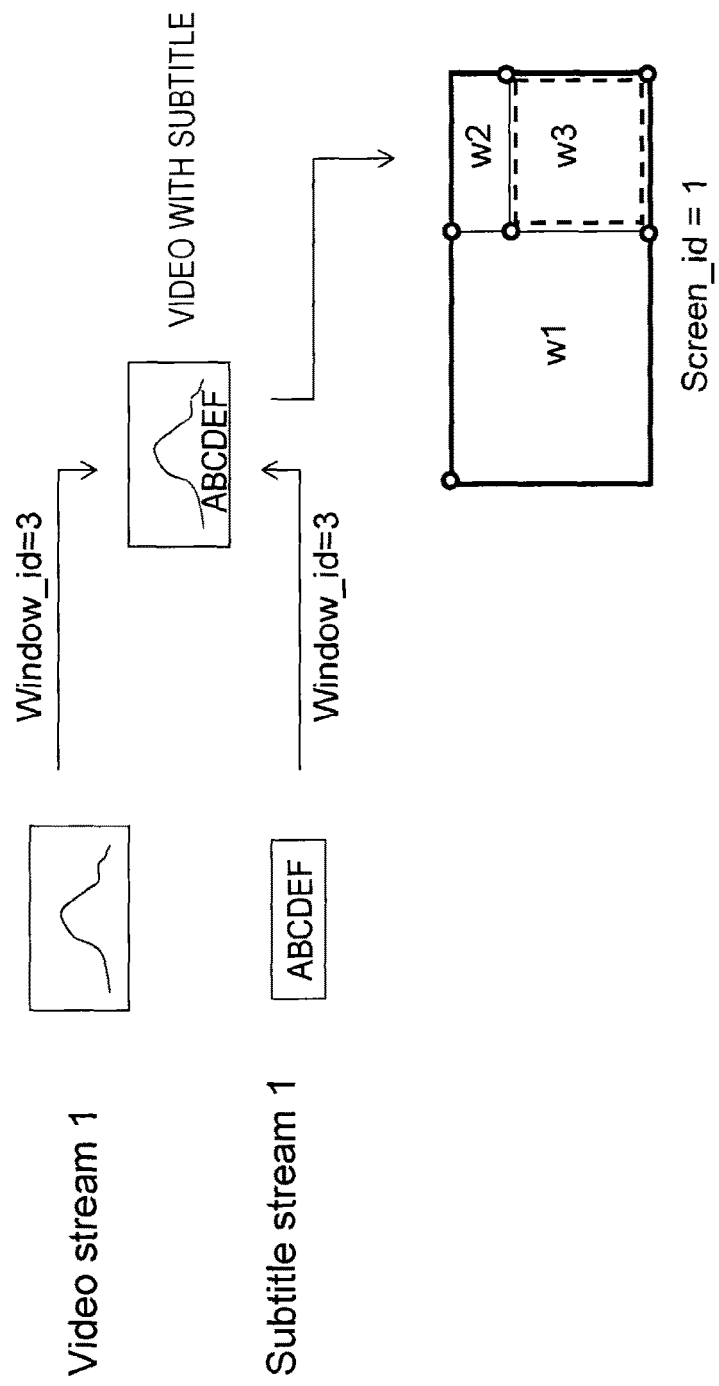
FIG. 10 is a drawing illustrating another exemplary display in the case where the streams are associated to one another for display by the window ID (window_id).

FIG. 10 illustrates yet another exemplary display in the case where the streams are associated to one another for display by the window ID (window_id). This example shows the case where the image of the video stream and the graphics stream, for example, the subtitle of the subtitle stream, are displayed on the identical display area.

Figure 11:
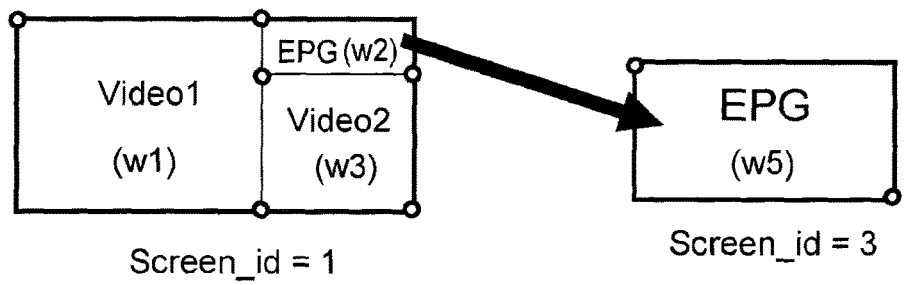
FIG. 11 is a drawing illustrating an exemplary display transition in the case where display permission information indicates a permission of a display at a display position (a screen or a window) other than a display position specified by display position specification information.

FIG. 11 illustrates an exemplary display transition in the case where the display permission information indicates the permission of the display at the display position (the screen or the window) other than the display position specified by the display position specification information. This example is an example where the display is transitioned such that the program guide displayed at the display unit (the window) "w2" of the "screen device 1" with "Screen ID=1" is displayed on the display unit (the window) "w5" of the "screen device 3" with "Screen ID=3."

For example, in the case where the "screen device 1" with "Screen ID=1" is the HD resolution although the display resolution model is 4 K, it is extremely difficult for viewers to view the program guide displayed on the display unit (the window) "w2." However, as described above, displaying the program guide on the display unit (the window) "w5" of the "screen device 3" allows increasing a size of and also clarifying characters of the program guide.

Although the illustration is omitted, in the case where the display position specification information specifies the display of the images of a plurality of the video streams on the respective different screen devices, it is also considered that these plurality of images are displayed brought together on one screen device. For example, this display is effective in the case where a facility of a plurality of the screen devices is absent.

Figure 12:
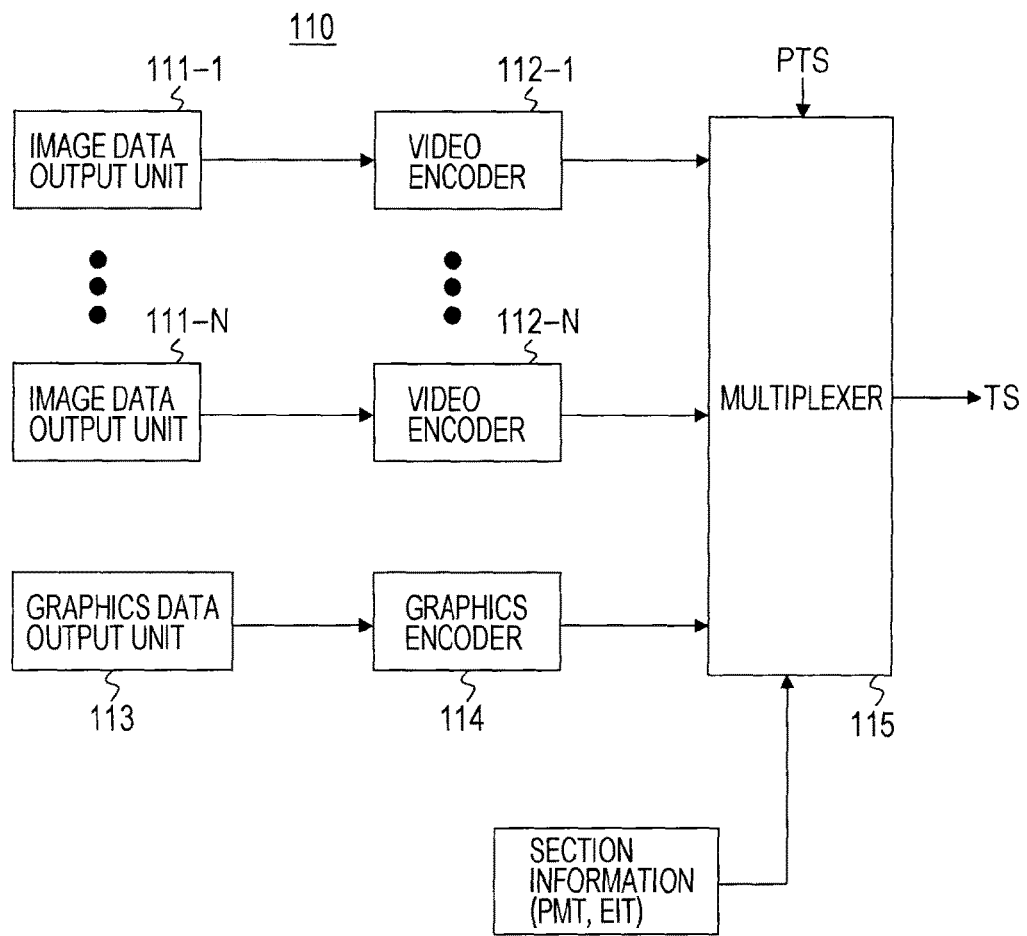
FIG. 12 is a block diagram illustrating an exemplary configuration of a transmission data generator that generates a transport stream TS in a transmitting apparatus.

FIG. 12 illustrates an exemplary configuration of a transmission data generator 110 that generates the above-described transport stream TS in the transmitting apparatus 100. This transmission data generator 110 includes image data output units 111-1 to 111-N, video encoders 112-1 to 112-N, graphics data output units 113, a graphics encoder 114, and a multiplexer 115.

The image data output units 111-1 to 111-N output N pieces of image data. The image data output units 111-1 to 111-N are configured by, for example, a camera that takes a photographic subject and outputs image data, an image data reading unit that reads image data from a storage medium and outputs the image data, or a similar unit. Here, the N pieces of image data may include a predetermined count of image data pertaining to one another. For example, the image data is image data of a predetermined count of views constituting a three-dimensional image or the predetermined count of image data constituting a high-resolution image.

The video encoders 112-1 to 112-N each performs coding, such as MPEG4-AVC (MVC), MPEG2 video, or HEVC, on the image data output from the image data output units 111-1 to 111-N to obtain coded image data. Additionally, the video encoders 112-1 to 112-N each generates the video stream (the video elementary stream) including the coded image data with a stream formatter (not shown) provided at a latter part.

The graphics data output unit 113 outputs data of graphics (including the subtitle as the subtitle) superimposed on the image or displayed alone. The graphics encoder 114 generates the graphics stream (the graphics elementary stream) including the graphics data output from the graphics data output unit 113. Here, the graphics configures superimposition information. The superimposition information is, for example, a logo and the subtitle.

The multiplexer 115 packetizes and multiplexes each elementary stream, which is generated by the video encoders 112-1 to 112-N and the graphics encoder 114 to generate the transport stream TS. In this case, for synchronized play on the receiving side, Presentation Time Stamp (PTS) is inserted into a header of each Packetized Elementary Stream (PES).

The multiplexer 115 inserts the display position specification information, which specifies the display position corresponding to each video stream, graphics stream, and electronic program guide information, into the layer of the transport stream TS. Here, as described above, the display position specification information is information that specifies, for example, the display target screen and/or the display unit (the window) on the display target screen.

The display position specification information corresponding to the video stream is inserted under the video elementary loop (the Video ES loop) of a Program Map Table (PMT) included in the transport stream TS. Additionally, the display position information corresponding to the graphics stream is inserted under a graphics elementary loop (Graphics ES loop) of the program map table, which is included in the transport stream TS.

The electronic program guide information is included in a Component descriptor inserted under an Event Information Table (EIT). The display position specification information corresponding to the electronic program guide information is inserted under the EIT. Details of the display position specification information will be described later.

Additionally, the display position specification information, which is made correspond to the predetermined video stream and specifies the display unit (the window) on the display target screen, may be inserted into the layer of the transport stream TS. In this case, the video encoder, which generates the predetermined stream, inserts the position change information into the layer of the video stream. The position change information indicates whether to change the position of the display unit (the window) or not.

Note that when this position change information indicates the change, the video encoder further inserts the display position information with the resolution coordinate specified by the display resolution model. The information is, for example, inserted into the user data region at the picture header or the sequence header of the video stream. The details of the information will be described later.

The following briefly describes operations by the transmission data generator 110 illustrated in FIG. 12. N pieces of the image data output from N pieces of the image data output units 111-1 to 111-N are each supplied to N pieces of the video encoders 112-1 to 112-N. Each video encoder performs coding, such as the MPEG4-AVC (MVC), MPEG2 video, or HEVC, on the image data to obtain the coded image data. Then, the video encoder each generates the video stream (the video elementary stream) including the coded image data.

When the multiplexer 115 inserts the display position specification information, which is made correspond to an output video stream of itself and specifies the display unit (the window) on the display target screen, into the layer of the transport stream TS, the position change information is inserted into the layer of the output video stream. The position change information indicates whether to change the position of the display unit (the window) or not. Then, when the position change information indicates the change, the display position information with the resolution coordinate specified by the display resolution model is further inserted into each video encoder.

The graphics data (including the subtitle data) output from the graphics data output unit 113 is supplied to the graphics encoder 114. The graphics encoder 114 generates the graphics stream (the graphics elementary stream) including the graphics data.

The multiplexer 115 packetizes and multiplexes the elementary stream supplied from each encoder to generate the transport stream TS. In this case, for synchronized play on the receiving side, the PTS is inserted into a header of each PES. Additionally, the multiplexer 115 inserts the display position specification information, which specifies the display position corresponding to each video stream, graphics stream, and electronic program guide information, into the layer of the transport stream TS.

[Structures of Display Position Specification Information and Position Change Information and TS Configuration]

As described above, the display position specification information, which specifies the display position corresponding to each video stream, graphics stream, and electronic program guide information, is inserted into the layer of the transport stream TS. FIG. 13 illustrates an exemplary configuration (Syntax) of a display window positioning descriptor (display_window_positioning descriptor) as the display position specification information. Additionally, FIG. 14 illustrates a content (Semantics) of main information in the exemplary configuration illustrated in FIG. 13.

The "display_window_positioning_descriptor_tag" is eight-bit data indicative of a descriptor type. Here, the "display_window_positioning_descriptor_tag" indicates that the descriptor type is the display window positioning descriptor. The "display_window_positioning_descriptor_length" is eight-bit data indicative of a length (a size) of the descriptor. This data indicates the subsequent byte count as the length of the descriptor.

The one-bit field of the "display_unconstraint_flag" indicates whether a receiver side can set the display position (the screen and the window) to a position other than the specified position at the display or not. "1" indicates that rendering at the display position on the receiver side has freedom. "0" indicates that the rendering at the display position on the receiver side does not have the freedom; therefore, it is required to follow the instruction by this descriptor.

The four-bit field of the "stream_screen_id" is an identifier that specifies (identifies) the display target screen. The four-bit field of the "window_id" is an identifier that specifies (identifies) the display unit (the window) on the screen of the display target.

The four-bit field of the "rendering_model" indicates the display resolution model at the display target screen. For example, "0001" indicates the full HD resolution, namely, a resolution of 1920 (H)*1080 (V). Additionally, for example, "0010" indicates 4 K resolution, namely, the resolution of 3840 (H)*2160 (V). Additionally, for example, "0100" indicates 8 K resolution, namely, the resolution of 7680 (H)*4320 (V).

The 16-bit field of the "V_start_offset" indicates a vertical display start position of the display unit (the window) at the resolution coordinate specified by the "rendering_model." The 16-bit field of the "V_end_offset" indicates a vertical display end position of the display unit (the window) at the resolution coordinate specified by the "rendering_model." The 16-bit field of the "H_start_offset" indicates a horizontal display start position of the display unit (the window) at the resolution coordinate specified by the "rendering_model." The 16-bit field of the "H_end_offset" indicates a horizontal display end position of the display unit (the window) at the resolution coordinate specified by the "rendering_model."

Additionally, although not described above, delivery service information is inserted into the layer of the transport stream TS. The delivery service information indicates whether the service is multiple delivery service or not. FIG. 15(a) illustrates an exemplary configuration (Syntax) of a multi-windows service descriptor (multi_windows_service_descriptor) as this delivery service information. Additionally, FIG. 15(b) illustrates a content (Semantics) of the main information in the exemplary configuration illustrated in FIG. 15(a).

The "multi_windows_service_descriptor_tag" is eight-bit data indicative of a descriptor type. Here, the "multi_windows_service_descriptor_tag" indicates that the descriptor type is the multi-windows service descriptor. The "multi_windows_service_descriptor_length" is eight-bit data indicative of a length (a size) of the descriptor. This data indicates the subsequent byte count as the length of the descriptor.

The one-bit field of the "multiple_stream_service_flag" indicates whether the service is the multiple delivery service or not. "1" indicates that the service is the multiple delivery service. "0" indicates that the service is non-multiple delivery service. The four-bit field of the "number_of_streams" indicates a total count of streams involving the delivery service. For example, "0001" indicates one stream while "1111" indicates 15 streams.

Additionally, as described above, into the layer of the video stream, the position change information, which indicates whether to change the position of the display unit (the window) or not, is inserted. For example, in the case of a coding system being MPEG4-AVC (MVC) or a coding system being a coding system such as the HEVC whose coding structure is similar to a coding structure of a NAL unit or a similar unit, this position change information is inserted into the "SEIs" part of the access unit (AU) as an SEI message. For example, this position change information is inserted as the SEI message (window_attribute SEI message).

Figure 16A:
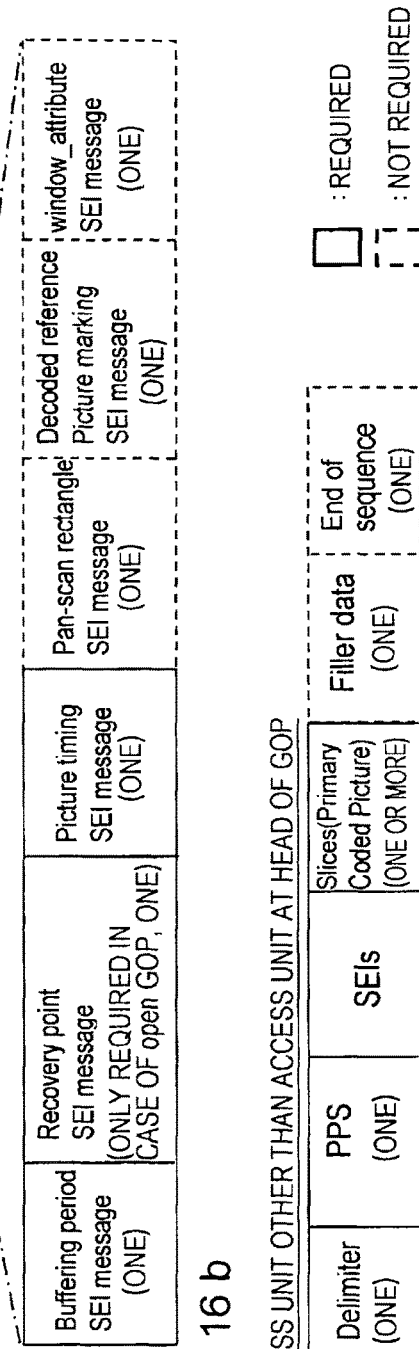
FIGS. 16(a) and 16(b) are drawings for describing an insertion of a window attribute SEI message (window_attribute SEI message) into a "SELs" part of an access unit.
Figure 16B:
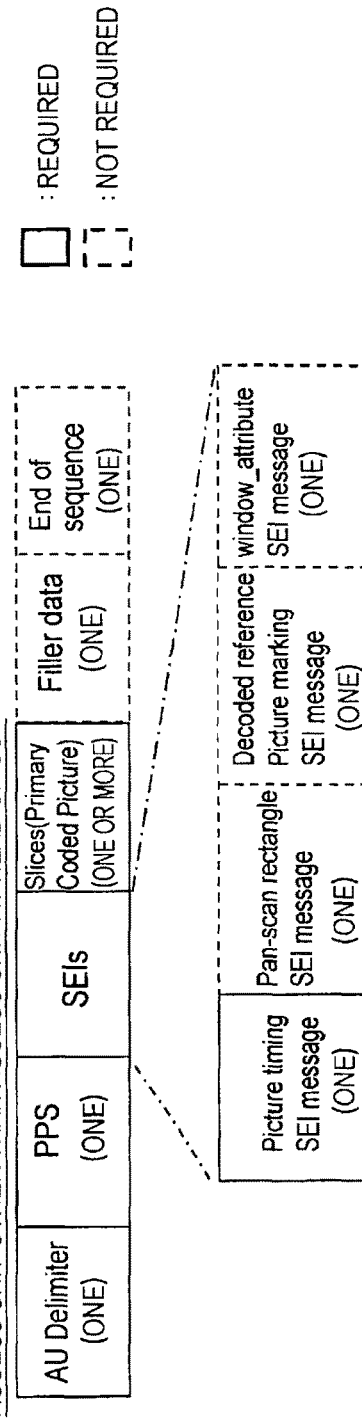

FIG. 16(a) illustrates an access unit at the head of a Group of Pictures (GOP). FIG. 16(b) illustrates an access unit other than the access unit at the head of the GOP. When inserting the position change information in units of GOPs, the "window_attribute SEI message" is inserted into only the access unit at the head of the GOP.

FIG. 17(a) illustrates an exemplary configuration (Syntax) of "window_attribute SEI message." The "uuid_iso_iec_11578" has a UUID value indicated by "ISO/IEC 11578:1996 AnnexA." "window_attribute_data( )" is inserted into a field of the "user_data_payload_byte." FIG. 17(b) illustrates an exemplary configuration (Syntax) of "window_attribute_data( )." In this "window_attribute_data( )", a window attribute SEI, "window_attribute_sei( )" is inserted. The "userdata_id" is an identifier of the "window_attribute_sei( )" indicated by unsigned 16 bits.

FIG. 18 illustrates an exemplary configuration (Syntax) of the "window_attribute_sei( )" Additionally, FIG. 19 illustrates a content (Semantics) of main information in the exemplary configuration illustrated in FIG. 18. The one-bit field of the "window_position_change_flag" indicates whether to change the display position of the display unit (the window) or not. "1" indicates that the display position is changed. "0" indicates that the display position is not changed.

The four-bit field of the "rendering_model" indicates the display resolution model at the display target screen. For example, "0001" indicates the full HD resolution, namely, a resolution of 1920 (H)*1080 (V). Additionally, for example, "0010" indicates 4 K resolution, namely, the resolution of 3840 (H)*2160 (V). Additionally, for example, "0100" indicates 8 K resolution, namely, the resolution of 7680 (H)*4320 (V).

The 16-bit field of the "V_start_offset" indicates a vertical display start position of the display unit (the window) at the resolution coordinate specified by the "rendering_model." The 16-bit field of the "V_end_offset" indicates a vertical display end position of the display unit (the window) at the resolution coordinate specified by the "rendering_model." The 16-bit field of the "H_start_offset" indicates a horizontal display start position of the display unit (the window) at the resolution coordinate specified by the "rendering_model." The 16-bit field of the "H_end_offset" indicates a horizontal display end position of the display unit (the window) at the resolution coordinate specified by the "rendering_model."

FIG. 20 illustrates an exemplary configuration of the transport stream TS. This exemplary configuration indicates the case where the transport stream TS includes the two video streams and the one subtitle stream. That is, this exemplary configuration includes "video PES1", "video PES2", and "subtitle PES3." The "video PES1" and "video PES2" are PES packets of the video stream where the image data are coded. The "subtitle PES3" is a PES packet of the subtitle stream where the subtitle data is coded. To indicate whether to change the position of the display unit (the window) or not, the above-described window attribute SEI (window_attribute_sei( ) is inserted into each stream.

Additionally, the transport stream TS includes a Program Map Table (PMT) as Program Specific Information (PSI). This PSI is information that describes to which program that each elementary stream included in the transport stream belongs to.

In the PMT, a program loop (Program loop) that describes information pertaining to the entire program exists. To indicate whether the service is the multiple delivery service or not, the above-described multi-windows service descriptor (multi_windows_service_descriptor) is inserted under this program loop.

In the PMT, the elementary loop having information related to each elementary stream exists. In this exemplary configuration, the video elementary loops (Video ES1 loop and Video ES2 loop) and a subtitle elementary loop (Subtitle ES3 Loop) exist. At each elementary loop, information such as a stream type and a packet identifier (PID) is arranged corresponding to each elementary stream. Additionally, at each elementary loop, a descriptor describing information pertaining to the video elementary stream is also arranged.

As one of this descriptor, the above-described display window positioning descriptor (display_window_positioning descriptor) is inserted. This specifies the image display position of each video stream. This also specifies the display position of the subtitle of the subtitle stream.

Additionally, the transport stream TS includes an Event Information Table (EIT) as Serviced Information (SI) that performs management in units of events (programs). Under this EIT as well, a component descriptor (Component_descriptor) is inserted. This component descriptor includes the electronic program guide information. Under this EIT, to specify the display position of the electron program guide, the above-described display window positioning descriptor (display_window_positioning descriptor) is inserted.

"Exemplary Configuration of Receiving Apparatus"

Figure 21:
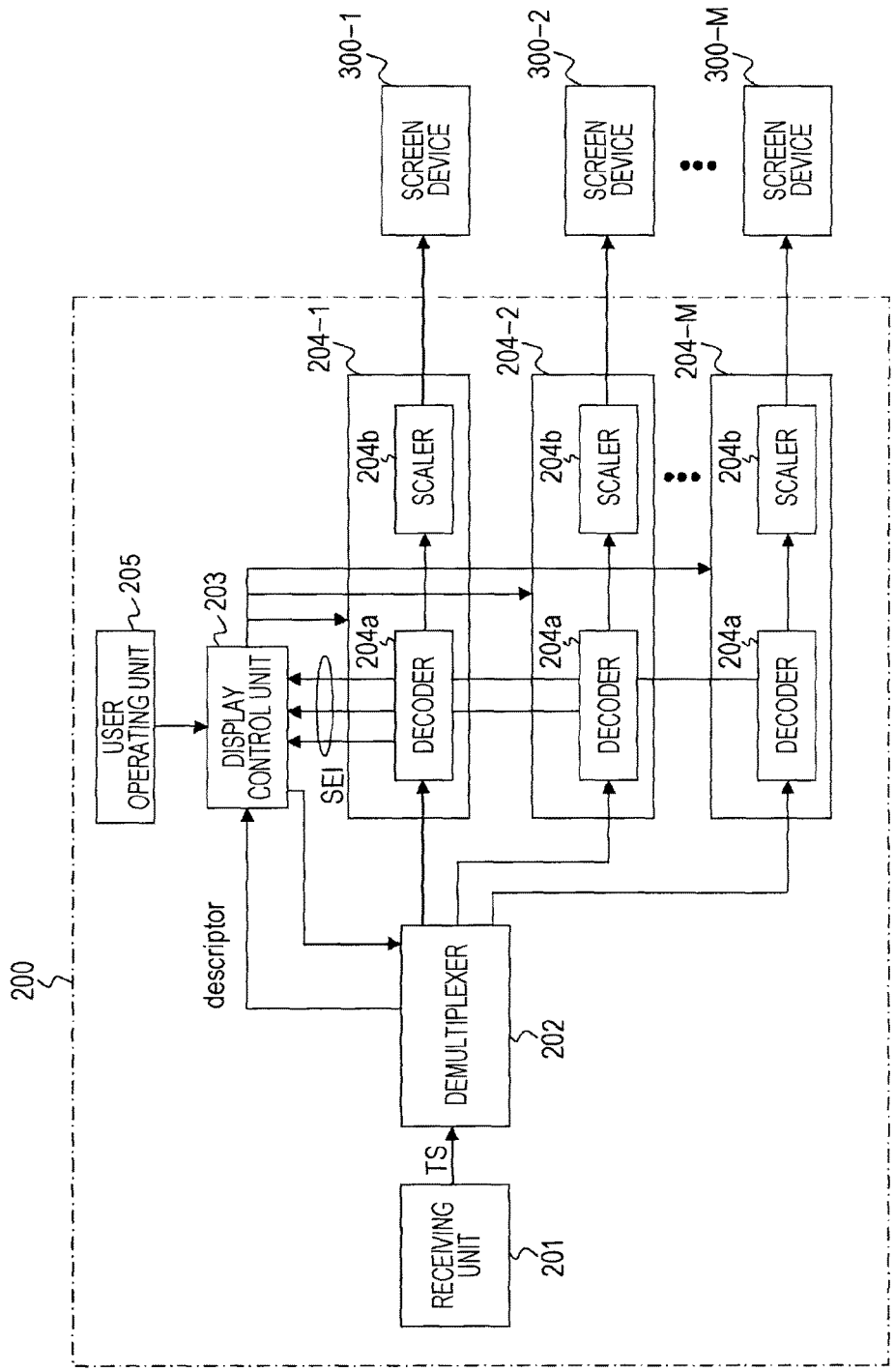
FIG. 21 is a block diagram illustrating an exemplary configuration of a receiving apparatus.

FIG. 21 illustrates an exemplary configuration of the receiving apparatus 200. This receiving apparatus 200 includes a receiving unit 201, a demultiplexer 202, a display control unit 203, a user operating unit 205, and M pieces of information processors 204-1 to 204-M.

The receiving unit 201 receives the transport stream TS transmitted from the transmitting apparatus 100 via the broadcast wave or via the network. The receiving unit 201 is configured by a digital tuner, a network interface, or a similar component.

The demultiplexer 202 extracts a display window positioning descriptor (see FIG. 13) and a multi-windows service descriptor (see FIG. 15(a)) from this transport stream TS and transmits the extractions to the display control unit 203.

The display control unit 203 can obtain the display position specification information (stream_screen_id and window_id) of the image from the video stream, the graphics from the graphics stream, and the program guide from the electronic program guide information from the description of the display window positioning descriptor. Additionally, the display control unit 203 can obtain information (display_unconstraint_flag) whether a display position can be a position other than the specified display position (the screen and the window) on the receiver side or not from the description of the display window positioning descriptor.

Additionally, the display control unit 203 can obtain information (rendering_model) on the display resolution model at the display target screen from the description of the display window positioning descriptor. Furthermore, the display control unit 203 can obtain information (V_start_offset, V_end_offset, H_start_offset, and H_end_offset) on the display start positions (horizontal and vertical) and the display end positions (horizontal and vertical) of the display unit (the window) with the resolution coordinate by the display resolution model from the description of the display window positioning descriptor.

Additionally, the display control unit 203 can obtain information (multiple_stream_service_flag), which indicates whether the service is the multiple delivery service or not, from the description of the multi-windows service descriptor and information (number_of_streams) on the total count of streams pertaining to the delivery service.

The demultiplexer 202 extracts the video stream, the graphics stream (including the subtitle stream), and further the electronic program guide information from the transport stream TS received by the receiving unit 201 and selectively transmits the extractions to the information processors 204-1 to 204-M under the control by the display control unit 203.

Regarding the video stream, the demultiplexer 202 selects the information processor at a destination based on "stream_screen_id" in the display window positioning descriptor under the video elementary loop corresponding to this video stream. That is, the demultiplexer 202 basically sets the information processor coupled to the screen device having the "screen_id" corresponding to the "stream_screen_id" as the destination.

Additionally, regarding the graphics stream, the demultiplexer 202 selects the information processor at the destination based on the "stream_screen_id" in the display window positioning descriptor under the graphics elementary loop corresponding to this graphics stream. That is, the demultiplexer 202 sets the information processor coupled to the screen device having the "screen_id" corresponding to the "stream_screen_id" as the destination.

Additionally, regarding the electronic program guide information, the demultiplexer 202 selects the information processor at the destination based on the "stream_screen_id" in the display window positioning descriptor under the EIT. That is, the demultiplexer 202 sets the information processor coupled to the screen device having the "screen_id" corresponding to the "stream_screen_id" as the destination.

Note that, as described above, the demultiplexer 202 basically selects the information processor that becomes the destination for the video stream, the graphics stream, and the electronic program information based on the "stream_screen_id." However, if the information (display_unconstraint_flag) indicates permission of the change in the display position (the screen and the window) and the user performs the change operation of the display position, the demultiplexer 202 selects the information processor at the destination based on the change operation of the display position. Also note that without the use of the information (display_unconstraint_flag), it is also possible to select the information processor at the destination based on only the change operation of the display position by the user. Additionally, it is also possible that the demultiplexer 202 selects the information processor at the destination corresponding to a condition of the screen device actually coupled and even if the screen device corresponding to the "stream_screen_id" is not coupled, all information is displayed.

The information processors 204-1 to 204-M each process the video stream, the graphics stream, and the electronic program guide information supplied from the demultiplexer 202 to generate the data for display, such as the image, the graphics (including the subtitle), and the program guide. Then, the information processors 204-1 to 204-M perform the scaling process on the data for display as necessary. After that, the information processors 204-1 to 204-M transmit the data for display to the screen devices 300-1 to 300-M.

Each information processor includes a decoder 204a and a scaler 204b. The decoder 204a processes the video stream, the graphics stream, and the electronic program guide information, which are transmitted from the demultiplexer 202, to generate the data for display, such as the image, the graphics (including the subtitle), and the program guide.

Additionally, the decoder 204a extracts the window attribute SEI (see FIG. 18) from the video and graphics streams and transmits the extractions to the display control unit 203. The display control unit 203 can obtain information (window_position_change_flag) indicative of whether to change the display position of the display unit (the window) or not from the description of the window_attribute SEI. When this information indicates the change, the display control unit 203 can further obtain the information (rendering_model) on the display resolution model at the display target screen and information on the display start positions (horizontal and vertical) and the display end positions (horizontal and vertical) of the display unit (the window) at the resolution coordinate from the description of the window attribute SEI.

Under the control by the display control unit 203, the scaler 204b performs the scaling process or a similar process on the data for display, which is generated by the decoder 204, such that display of the image, the graphics (including the subtitle), the program guide, or similar data is displayed on the corresponding display unit (the window). In this respect, in the case where a resolution of the screen device of the display target differs from the display resolution model, the scaler 204a further performs the scaling process for adjustment of the difference in the resolution.

Note that as the display position information of the display unit (the window), basically, the information in the display window positioning descriptor extracted from the transport stream TS is used. However, when the information (window_position_change_flag) of the window attribute SEI, which is extracted from the streams of the videos and the graphics by the videos decoder 204a, indicates the change, the information in the window attribute SEI is used. This allows a dynamic change in the display position of the display unit (the window).

The following briefly describes operations by the receiving apparatus 200 illustrated in FIG. 21. The receiving unit 201 receives the transport stream TS transmitted from the transmitting apparatus 100 via the broadcast wave or via the network. This transport stream TS is supplied to the demultiplexer 202.

In the demultiplexer 202, the display window positioning descriptor (see FIG. 13) and the multi-windows service descriptor (see FIG. 15(a)) are extracted from the transport stream TS and are transmitted to the display control unit 203. The display control unit 203 obtains various information such as the display position specification information (stream_screen_id and window_id) from the description of the display window positioning descriptor.

The demultiplexer 202 extracts the video stream, the graphics stream (including the subtitle stream), and further the electronic program guide information from the transport stream TS and selectively transmits the extractions to the information processors 204-1 to 204-M under the control by the display control unit 203. In this case, the demultiplexer 202 basically selects the information processor coupled to the screen device having the "screen_id" corresponding to the "stream_screen_id" as the destination.

The information processors 204-1 to 204-M each processes the video stream, the graphics stream, and the electronic program guide information, which are supplied from the demultiplexer 202, to generate the data for display, such as the image, the graphics (including the subtitle), and the program guide. Then, the information processors 204-1 to 204-M perform the scaling process on the data for display as necessary. After that, the information processors 204-1 to 204-M transmit the data for display to the screen devices 300-1 to 300-M.

As described above, in the image transmission/reception apparatus 10, which is illustrated in FIG. 1, the display position specification information (stream_screen_id and window_id) of the image, the graphics (including the subtitle), and the program guide is inserted into the layers of the transport stream TS. Therefore, the transmitting side can actively control the display position of the image, the graphics, the program guide, or similar data.

In the image transmission/reception apparatus 10, which is illustrated in FIG. 1, to the display position specification information, information indicating whether to permit the display at the display position other than the display position specified by this display position specification information or not is added. Accordingly, the transmitting side can actively control whether to permit the display at the display position other than the display position specified by this display position specification information or not.

Additionally, in the image transmission/reception apparatus 10, which is illustrated in FIG. 1, the information that indicates whether to change the position of the display unit (the window) on the screen of the display target specified by the display position specification and, if this information indicates the change, the position information of the display unit are inserted into the layers of streams of video and the graphics. This allows the dynamic change in the display unit (the window) on the screen of the display target.

<2. Modifications>

"Modification 1"

Note that the image transmission/reception system 10 illustrated in FIG. 1 has the following configuration. The receiving apparatus 200 includes a decoder. The receiving apparatus 200 transmits the data for display, such as non-compressed image data, to each screen device. However, the following configuration is also possible. The receiving apparatus does not include the decoder. The receiving apparatus transmits a partial transport stream TS to each screen device. The partial transport stream TS includes the video stream, the graphics stream, and the electronic program guide information related to the display at the screen device. In this case, the receiving apparatus does not require the decoder.

Figure 22:
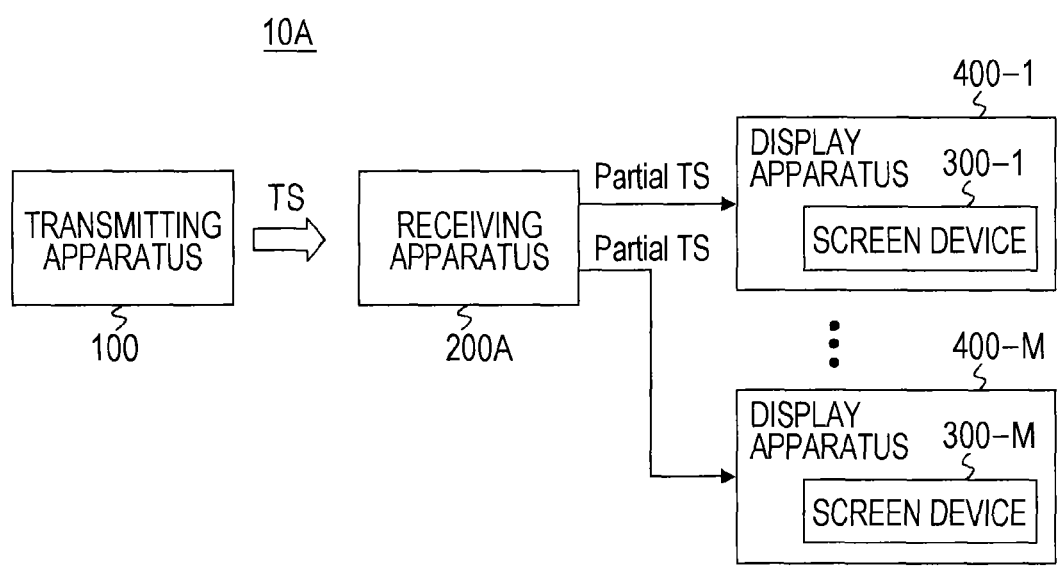
FIG. 22 is a block diagram illustrating another exemplary configuration of an image transmission/reception system.

FIG. 22 illustrates an exemplary configuration of an image transmission/reception system 10A in that case. Like reference numerals designate corresponding or identical elements throughout FIGS. 1 and 22, and therefore such elements will not be further elaborated here. This image transmission/reception system 10A is configured by the transmitting apparatus 100, the receiving apparatus 200A, and M pieces of display apparatuses 400-1 to 400-M. The display apparatuses 400-1 to 400-M each includes screen devices 300-1 to 300-M.

The receiving apparatus 200A receives the transport stream TS transmitted from the transmitting apparatus 100 via the broadcast wave or via the network. The receiving apparatus 200A performs a demultiplexing process and then a re-multiplexing process on this transport stream TS. Thus, the partial transport stream TS, which is transmitted to the display apparatuses 400-1 to 400-M, is generated. Then, the receiving apparatus 200A transmits the partial transport stream TS to each display apparatus 400-1 to 400-M.

In this respect, the receiving apparatus 200A obtains the display position specification information (the display target screen and the display unit (the window)) corresponding to the video stream, the graphics stream, and the electronic program information inserted into the layers of the transport stream TS. The receiving apparatus 200 generates the partial transport stream TS transmitted to each display apparatus 400-1 to 400-M based on this display position specification information.

The display apparatuses 400-1 to 400-M each performs the decoding process on the video stream, the graphics stream, and the electronic program guide information included in the partial transport stream TS, which is transmitted from the receiving apparatus 200A to obtain the data for display, such as the image, the graphics (including the subtitle), and the program guide. Then, the display apparatuses 400-1 to 400-M each causes the screen devices 300-1 to 300-M to display the image, the graphics (including the subtitle), the program guide, or similar data from the obtained data for display.

Figure 23:
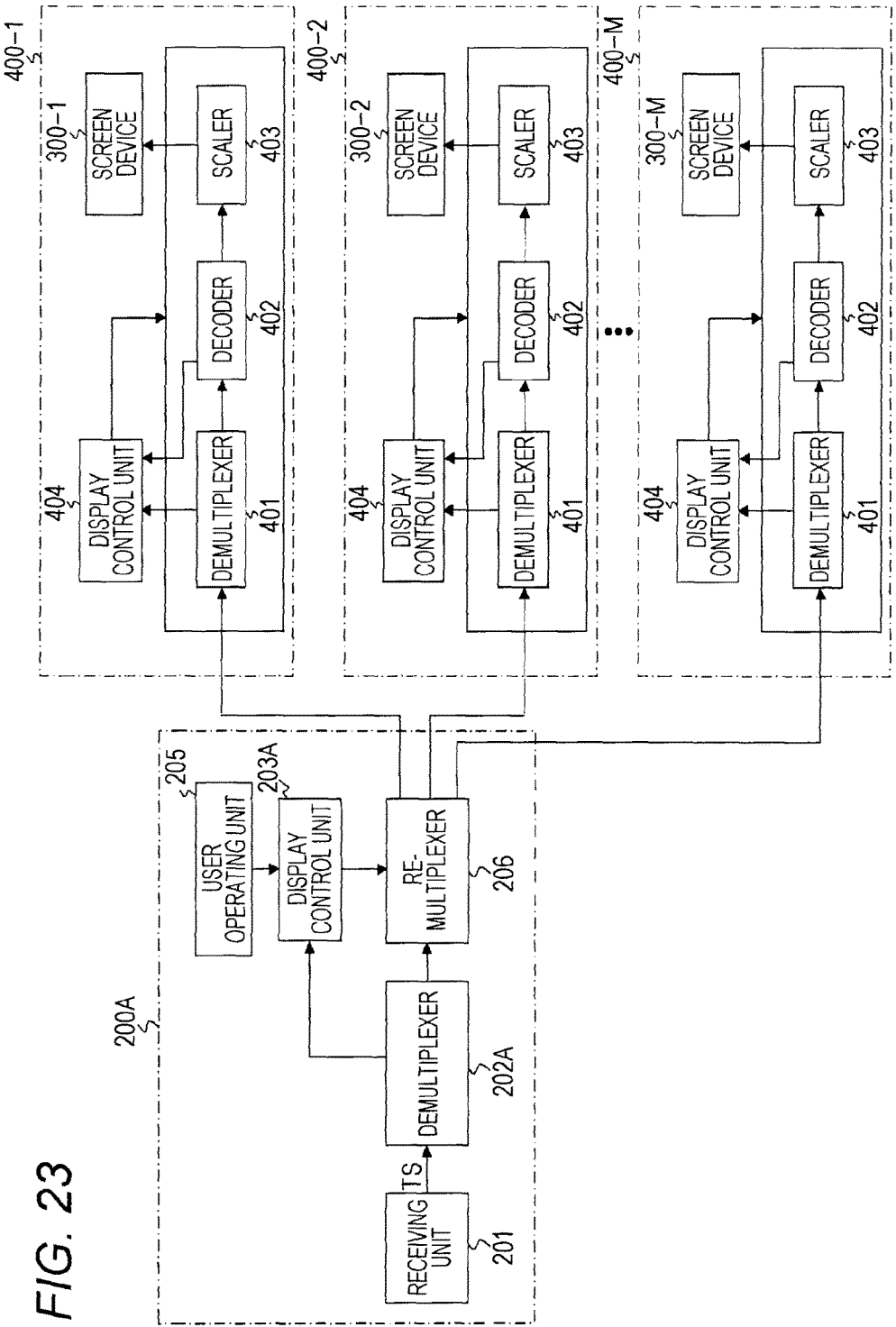
FIG. 23 is a block diagram illustrating an exemplary configuration of the receiving apparatus and display apparatuses.

FIG. 23 illustrates an exemplary configuration of the receiving apparatus 200A and the display apparatuses 400-1 to 400-M. Like reference numerals designate corresponding or identical elements throughout FIGS. 21 and 23, and therefore such elements will not be further elaborated here. The receiving apparatus 200A includes the receiving unit 201, a demultiplexer 202A, a display control unit 203A, the user operating unit 205, and a re-multiplexer 206.

The receiving unit 201 receives the transport stream TS transmitted from the transmitting apparatus 100 via the broadcast wave or via the network. The demultiplexer 202A extracts the video stream, the graphics stream (including the subtitle stream), further the electronic program guide information, or similar data from the transport stream TS received by the receiving unit 201 and transmits the extractions to the re-multiplexer 206.

Additionally, the demultiplexer 202A extracts the display window positioning descriptor (see FIG. 13) and the multi-windows service descriptor (see FIG. 15(*a*)) from this transport stream TS and transmits the extractions to the display control unit 203A. Under the control by the display control unit 203A, the re-multiplexer 206 generates the partial transport stream TS transmitted to each display apparatus 400-1 to 400-M.

Note that, the re-multiplexer 206 basically selects the display apparatus that becomes the destination for the video stream, the graphics stream, and the electronic program information based on the "stream_screen_id." However, if the information (display_unconstraint_flag) indicates permission of the change in the display position (the screen and the window) and the user performs the change operation of the display position, the re-multiplexer 206 selects the display apparatus at the destination based on the change operation of the display position.

The display apparatus 400 (400-1 to 400-M) includes a demultiplexer 401, a decoder 402, a scaler 403, a display control unit 404, and the screen device 300 (300-1 to 300-M).

The demultiplexer 401 extracts the video stream, the graphics stream (including the subtitle stream), and further the electronic program guide information from the partial transport stream TS transmitted from the receiving apparatus 200A and transmits the extractions to the decoder 402. Additionally, the demultiplexer 401 extracts the display window positioning descriptor (see FIG. 13) and the multi-windows service descriptor (see FIG. 15(*a*)) from this partial transport stream TS and transmits the extractions to the display control unit 404.

The display control unit 404 can obtain the display position specification information (stream_screen_id and window_id) of the image from the video stream, the graphics from the graphics stream, and the program guide from the electronic program guide information from the description of the display window positioning descriptor. Additionally, the display control unit 203 can obtain information (rendering_model) on the display resolution model at the display target screen from the description of the display window positioning descriptor. Furthermore, the display control unit 203 can obtain information (V_start_offset, V_end_offset, H_start_offset, and H_end_offset) on the display start positions (horizontal and vertical) and the display end positions (horizontal and vertical) of the display unit (the window) with the resolution coordinate by the display resolution model from the description of the display window positioning descriptor.

The decoder 402 processes the video stream, the graphics stream, and the electronic program guide information, which are transmitted from the demultiplexer 401, to generate the data for display, such as the image, the graphics (including the subtitle), and the program guide.

Additionally, the decoder 402 extracts the window attribute SEI (see FIG. 18) from the video and graphics streams and transmits the extractions to the display control unit 404. The display control unit 404 can obtain information (window_position_change_flag) indicative of whether to change the display position of the display unit (the window) or not from the description of the window attribute SEI. When this information indicates the change, the display control unit 404 can further obtain the information (rendering_model) on the display resolution model at the display target screen and information on the display start positions (horizontal and vertical) and the display end positions (horizontal and vertical) of the display unit (the window) at the resolution coordinate from the description of the window attribute SEI.

Under the control by the display control unit 404, the scaler 403 performs the scaling process or a similar process on the data for display, which is generated by the decoder 402, such that display of the image, the graphics (including the subtitle), the program guide, or similar data is displayed on the corresponding display unit (the window). In this respect, in the case where a resolution of the screen device 300 of the display target differs from the display resolution model, the scaler 403 further performs the scaling process for adjustment of the difference in the resolution. The screen device 300 displays the image, the graphics (including the subtitle), the program guide, or similar data based on the data for display output from the scaler 403.

Note that as the display position information of the display unit (the window), basically, the information in the display window positioning descriptor extracted from the partial transport stream TS is used. However, when the information (window_position_change_flag) of the window attribute SEI, which is extracted from the streams of the videos and the graphics by the videos by the decoder 402, indicates the change, the information in the window_attribute SEI is used. This allows the dynamic change in the display position of the display unit (the window).

The following briefly describes operations by the receiving apparatus 200A and the display apparatus 400 (400-1 to 400-M) illustrated in FIG. 23. The receiving apparatus 200A receives the transport stream TS transmitted from the transmitting apparatus 100 at the receiving unit 201 via the broadcast wave or via the network. This transport stream TS is supplied to the demultiplexer 202A.

The demultiplexer 202A extracts the video stream, the graphics stream (including the subtitle stream), further the electronic program guide information, or similar data from the transport stream TS received by the receiving unit 201 and supplies the extractions to the re-multiplexer 206.

Additionally, the demultiplexer 202A extracts the display window positioning descriptor (see FIG. 13) and the multi-windows service descriptor (see FIG. 15(a)) from this transport stream TS and transmits the extractions to the display control unit 203. The display control unit 203 obtains various information such as the display position specification information (stream_screen_id and window_id) from the description of the display window positioning descriptor.

Under the control by the display control unit 203A, the re-multiplexer 206 generates the partial transport stream TS transmitted to each display apparatus 400-1 to 400-M. Then, the re-multiplexer 206 transmits the corresponding partial transport streams TS to the display apparatuses 400-1 to 400-M.

The display apparatus 400 (400-1 to 400-M) supplies the partial transport stream TS transmitted from the receiving apparatus 200 to the demultiplexer 401. This demultiplexer 401 extracts the video stream, the graphics stream (including the subtitle stream), and further the electronic program guide information from the partial transport stream TS and supplies the extractions to the decoder 402.

Additionally, in the demultiplexer 401, the display window positioning descriptor (see FIG. 13) and the multi-windows service descriptor (see FIG. 15(a)) are extracted from the partial transport stream TS and are transmitted to the display control unit 404. The display control unit 404 obtains various information such as the display position specification information (stream_screen_id and window_id) from the description of the display window positioning descriptor.

The decoder 402 processes the video stream, the graphics stream, and the electronic program guide information, which are transmitted from the demultiplexer 401, to generate the data for display, such as the image, the graphics (including the subtitle), and the program guide. The data for display is supplied to the scaler 403.

Additionally, the decoder 402 extracts the window attribute SEI (see FIG. 18) from the video and graphics streams and transmits the extractions to the display control unit 404. The display control unit 404 obtains various information, such as information (window_position_change_flag) indicative of whether to change the display position of the display unit (the window) or not from the description of the window_attribute SEI.

Under the control by the display control unit 404, the scaler 403 performs the scaling process or a similar process on the data for display, which is generated by the decoder 402, such that display of the image, the graphics (including the subtitle), the program guide, or similar data is displayed on the corresponding display unit (the window). The data for display output from the scaler 403 is supplied to the screen device 300. The image, the graphics (including the subtitle), the program guide, or similar data are displayed on this screen device 300.

"Modification 2"

Alternatively, the image transmission/reception system 10, which is illustrated in FIG. 1, has the following configuration. The receiving apparatus 200 transmits the data for display, such as non-compressed image data, in parallel to each screen device. However, the following configuration is also possible. The receiving apparatus 200 transmits the data for display by an amount of all screen devices to a specific screen device. The specific screen device distributes the data for display to another screen device.

Figure 24:
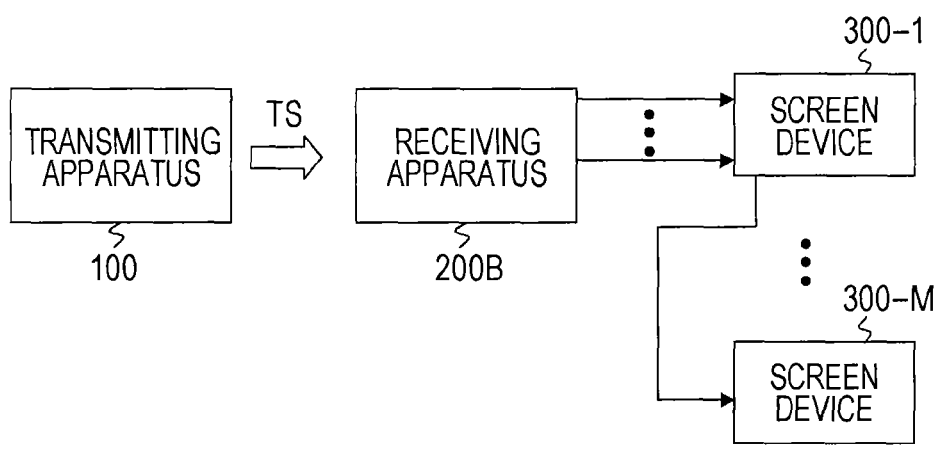
FIG. 24 is a block diagram illustrating another exemplary configuration of an image transmission/reception system.

FIG. 24 illustrates an exemplary configuration of an image transmission/reception system 10B in that case. Like reference numerals designate corresponding or identical elements throughout FIGS. 1 and 24, and therefore such elements will not be further elaborated here. This image transmission/reception system 10B includes the transmitting apparatus 100, the receiving apparatus 200B, and M pieces of the screen devices 300-1 to 300-M.

The receiving apparatus 200B transmits the data for display by the amount of all screen devices to a specific screen device, here, the screen device 300-1. The screen device 300-1 displays the image, the graphics, the program guide, or similar data based on the data for display for itself. Additionally, the screen device 300-1 distributes (transfers) the image data for display for other screen devices to the corresponding screen devices.

Figure 25:
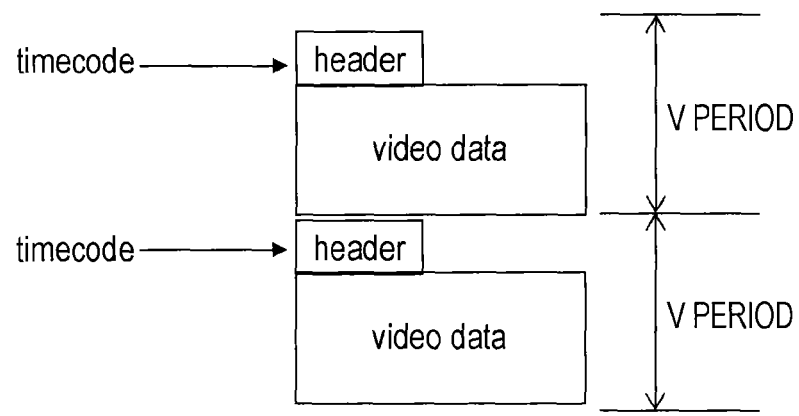
FIG. 25 is a drawing for describing insertions of time codes into header information of data such as non-compressed image data.

In this case, when the screen device 300-1 distributes the data for display to the other screen devices, a delay may occur randomly. This possibly disturbs synchronization of display between the respective screen devices. Therefore, the receiving apparatus 200B, as illustrated in FIG. 25, inserts time codes to header information. The header information is added in units of frames to the data for display of each screen device transmitted to the screen device 300-1. In this case, the receiving apparatus 200B, for example, converts a time stamp at 90 KHz inserted into the layer of the transport stream TS to a time code at 29.97 Hz, thus generating the time code.

The screen devices 300-1 to 300-M each controls a display timing based on the time code. In this case, the screen devices 300-1 to 300-M mutually exchange clock (time) information by wired or wireless. This allows achieving mutual synchronization of display.

Figure 26:
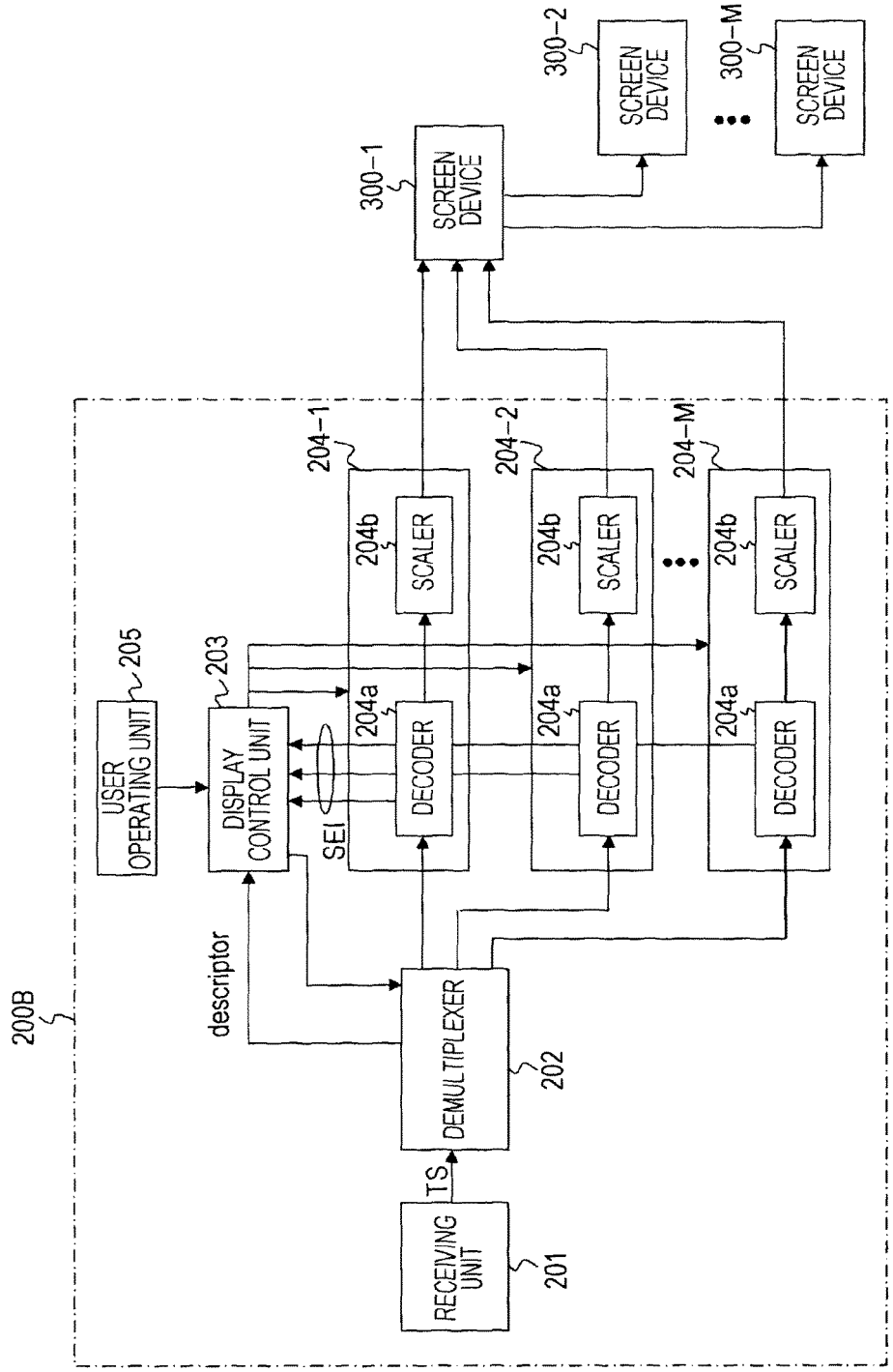
FIG. 26 is a block diagram illustrating an exemplary configuration of the receiving apparatus.

FIG. 26 illustrates an exemplary configuration of the receiving apparatus 200B. Like reference numerals designate corresponding or identical elements throughout FIGS. 21 and 26, and therefore such elements will not be further elaborated here. Under the control by a display control unit 203B, the information processors 204-1 to 204-M insert the time codes into the header information. The header information is added in units of frames to the data for display of each screen device transmitted to the screen device 300-1. Although the detailed description is omitted, other parts of this receiving apparatus 200B are similar to the receiving apparatus 200, which is illustrated in FIG. 21.

"Modification 3"

Additionally, the image transmission/reception system 10 illustrated in FIG. 1 has the following configuration. The receiving apparatus 200 transmits the data for display, such as non-compressed image data, in parallel to each screen device. However, the following configuration is also possible. A display apparatus that includes a specific screen device generates the data for display by the amount of all screen devices. The display apparatus distributes the data for display to other screen devices. In this case, a receiving apparatus is not required.

Figure 27:
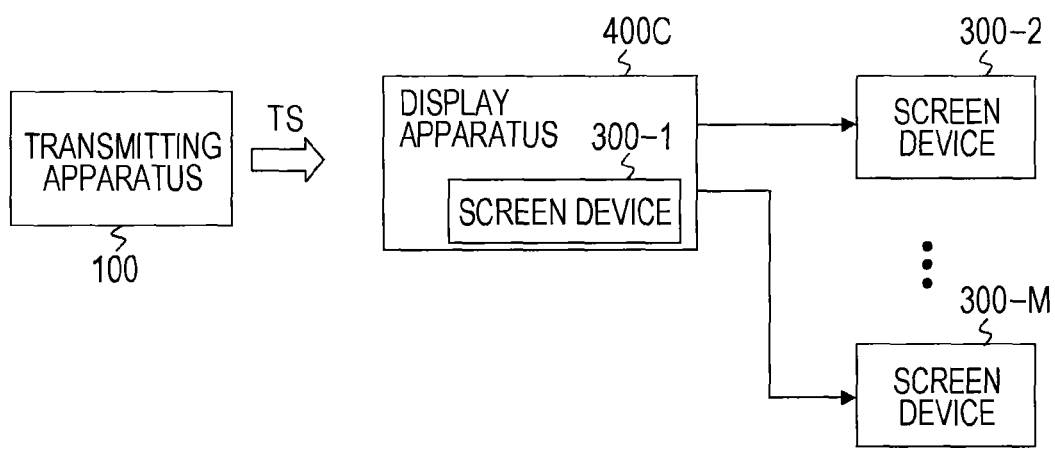
FIG. 27 is a block diagram illustrating another exemplary configuration of the image transmission/reception system.

FIG. 27 illustrates an exemplary configuration of an image transmission/reception system 100 in that case. Like reference numerals designate corresponding or identical elements throughout FIGS. 1 and 27, and therefore such elements will not be further elaborated here. This image transmission/reception system 100 is configured by the first transmitting apparatus 100, a display apparatus 400C, and M−1 pieces of the screen devices 300-2 to 300-M. The display apparatus 400C includes the screen device 300-1.

The display apparatus 400C receives the transport stream TS transmitted from the transmitting apparatus 100 via the broadcast wave or via the network. The display apparatus 400C has functions similar to the receiving apparatus 200 illustrated in FIG. 1. The display apparatus 400C generates the data for display of the image, the graphics (including the subtitle), and the program guide that should be supplied to the screen devices 300-1 to 300-M. Then, the display apparatus 400C causes the screen device 300-1, which is included by itself, to display the image, the graphics (including the subtitle), the program guide, or similar data by the data for display. Additionally, the display apparatus 400C transmits the corresponding data for display to the other screen devices 300-2 to 300-M.

Figure 28:
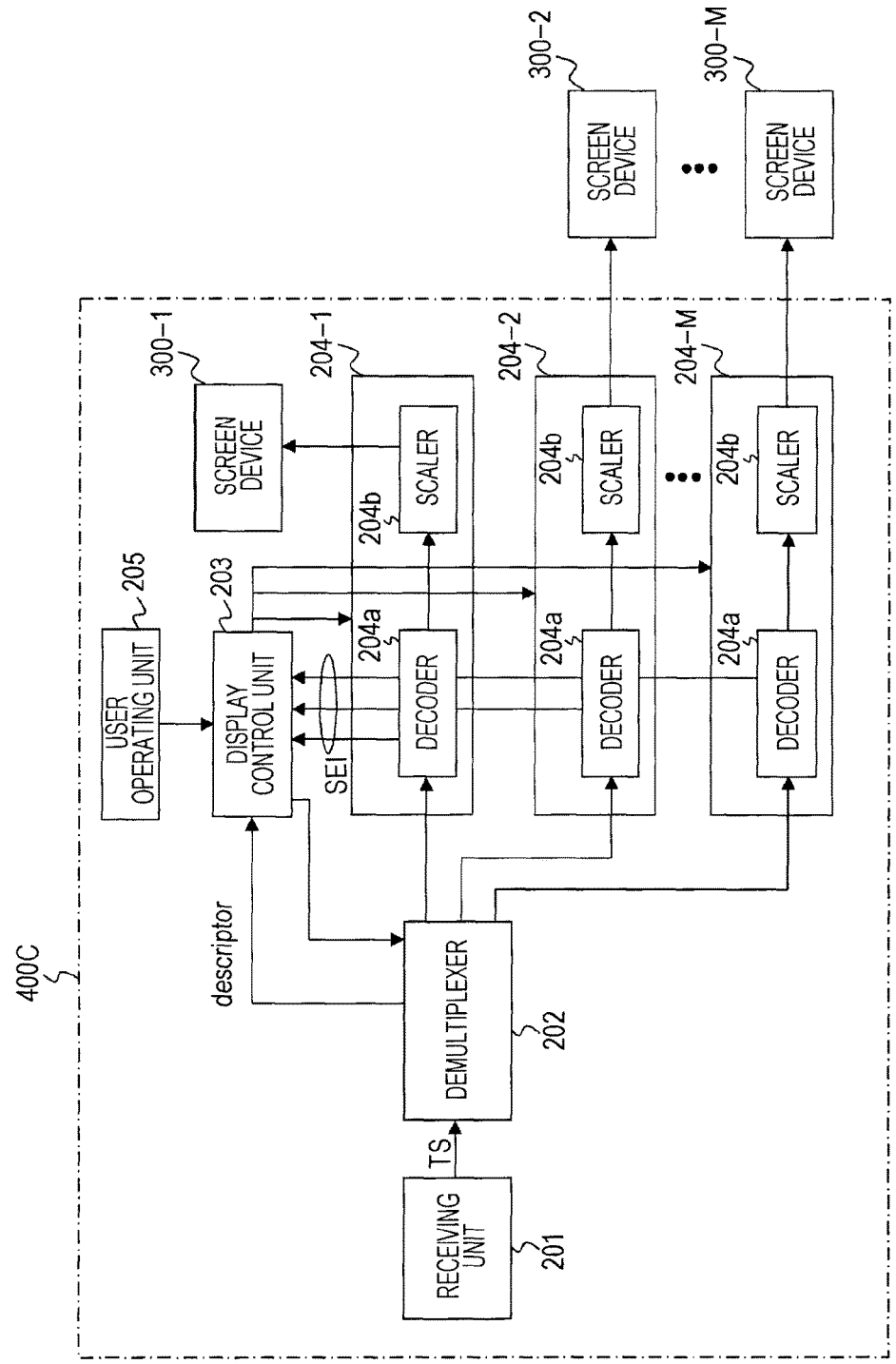
FIG. 28 is a block diagram illustrating an exemplary configuration of the display apparatus.

FIG. 28 illustrates an exemplary configuration of the display apparatus 400C. Like reference numerals designate corresponding or identical elements throughout FIGS. 21 and 28, and therefore such elements will not be further elaborated here. Although the detailed description is omitted, the display apparatus 400O includes the screen device 300-1. Otherwise, this display apparatus 400C is similarly configured to the display apparatus 200, which is illustrated in FIG. 21.

"Others"

Additionally, the above-described embodiments describe the example where a plurality of the service streams are supplied with one container. For example, as shown in FIG. 29(a), one broadcast service container includes a primary stream and a secondary stream. The receiving side processes each stream included in this container. The specified screen and display unit (the window) display a content of each stream.

However, this technique is also similarly applicable to the case where a plurality of the service streams are supplied with a plurality of the containers. For example, as illustrated in FIG. 29(b), a first broadcast service container includes the primary stream, and a second broadcast service container includes the secondary stream. In this case, the receiving side processes each stream included in each container. The specified screen and display unit (the window) display the content of each stream. In this case, a mechanism coordinating between the broadcast services is employed.

Figure 30:
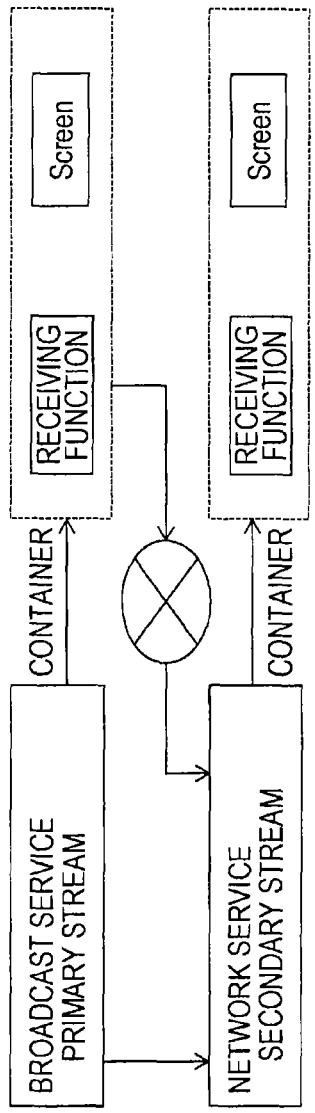
Figure 30:
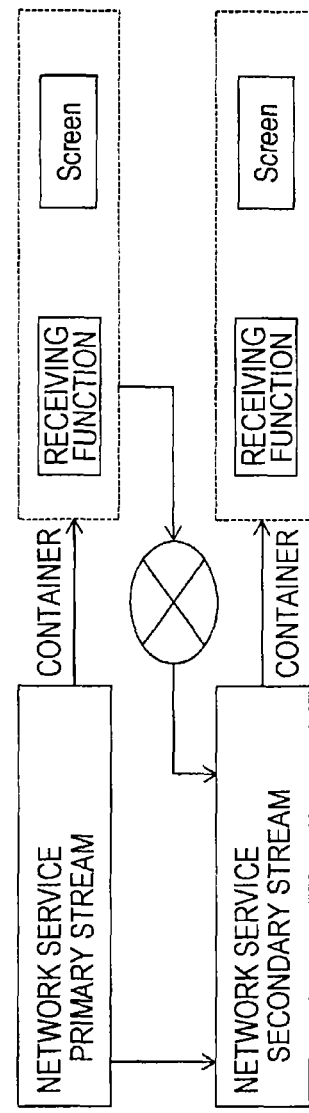

Additionally, for example, the case includes that, as illustrated in FIG. 30(a), the broadcast service container includes the primary stream and the network service container includes the secondary stream. In this case, the receiving side processes each stream included in each container. The specified screen and display unit (the window) display the content of each stream. In this case, a mechanism coordinating between the broadcast service and the network service is employed.

Additionally, for example, the case includes that, as illustrated in FIG. 30(b), a first network service container includes the primary stream, and a second network service container includes the secondary stream. In this case, the receiving side processes each stream included in each container. The specified screen and display unit (the window) display the content of each stream. In this case, a mechanism coordinating between the network services is employed.

Figure 31:
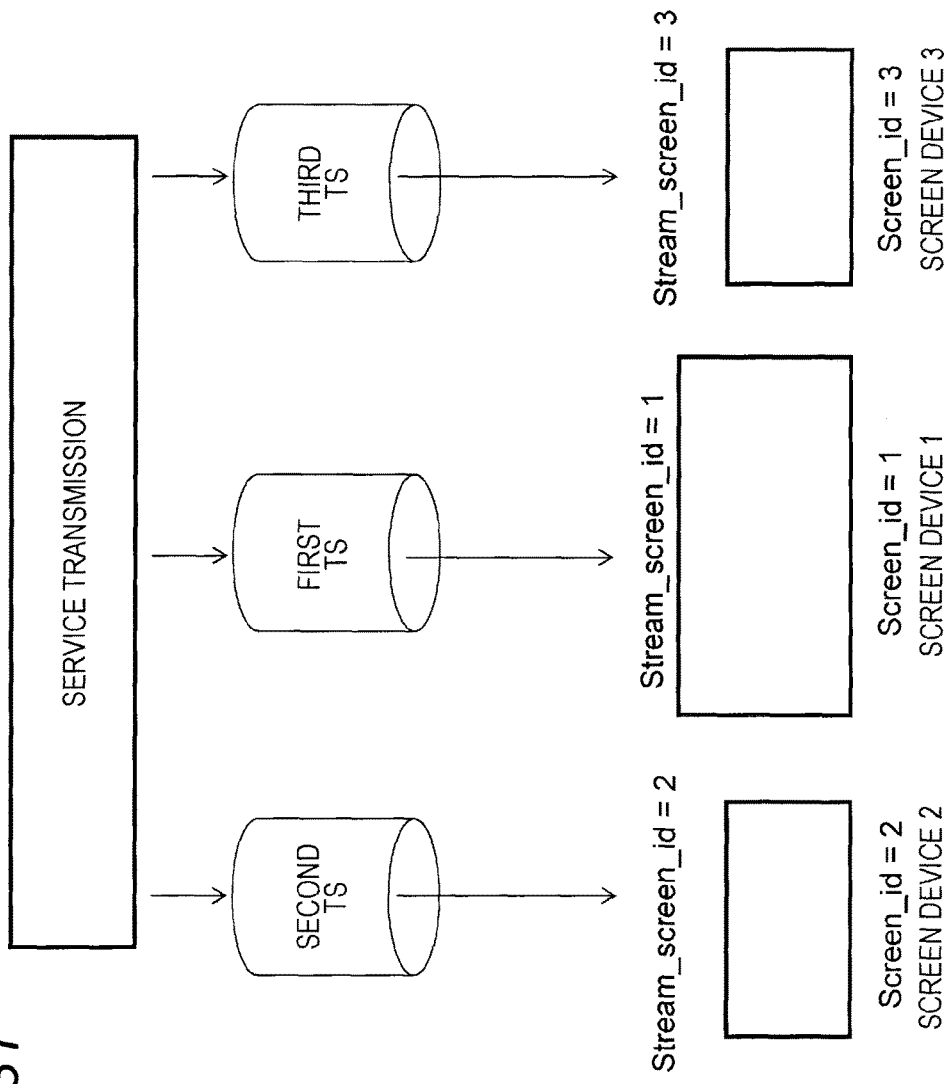
FIG. 31 is a drawing illustrating an exemplary image display in the case where a plurality of the service streams is supplied with a plurality of the containers.

FIG. 31 illustrates an exemplary image display in the case where a plurality of the service streams are supplied with a plurality of the containers. This example is an example where the three video streams are supplied by the three transport streams TS. In this case, corresponding to the first video stream included in the first transport stream TS, "Stream_screen_ID=1" is inserted into this first transport stream TS as the display position specification information. Accordingly, the image data obtained by decoding this first video stream is supplied to the "screen device 1" with "Screen ID=1." Thus, the image is displayed on the screen.

Additionally, in this case, corresponding to the second video stream included in the second transport stream TS, "Stream_screen_ID=2" is inserted into this second transport stream TS as the display position specification information. Accordingly, the image data obtained by decoding this second video stream is supplied to the "screen device 2" with "Screen ID=2." Thus, the image is displayed on the screen.

Additionally, in this case, corresponding to the third video stream included in the third transport stream TS, "Stream_screen_ID=3" is inserted into this third transport stream TS as the display position specification information. Accordingly, the image data obtained by decoding this third video stream is supplied to the "screen device 3" with "Screen ID=3." Thus, the image is displayed on the screen.

Additionally, the above-described embodiments describe the example where the container is the transport stream (MPEG-2 TS). However, this technique is also similarly applicable to a system with a configuration that uses a network such as the Internet for distribution to a reception terminal. In the distribution over the Internet, the streams are often distributed with the container in MP4 or a format other than MP4. That is, as the container, the containers in various formats, such as the transport stream (MPEG-2 TS) used in a digital broadcast standard and the MP4 used for Internet delivery, apply.

Additionally, this technique can also employ the following configurations.

(1) A transmitting apparatus including:

a transmitting unit configured to transmit a container in a predetermined format, the container including a video stream obtained by coding image data; and an information inserting unit configured to insert display position specification information into a layer of the container, the display position specification information specifying a display position of an image by the image data.

(2) The transmitting apparatus according to (1), wherein the display position specification information is information specifying a display target screen.

(3) The transmitting apparatus according to (1) or (2), wherein the display position specification information is information specifying a display unit on a display target screen.

(4) The transmitting apparatus according to (3), wherein information indicative of a display resolution model at the display target screen is added to the display position specification information, display position information at a resolution coordinate specified by the display resolution model also being added to the display position specification information.

(5) The transmitting apparatus according to (4), wherein
the information inserting unit is configured to further insert, into a layer of the video stream, information indicative of whether to change a position of a display unit on the display target screen specified by the display position specification information or not and, if the information indicates a change, display position information of the display unit.

(6) The transmitting apparatus according to any of (1) to (5), wherein
information indicative of whether to permit a display at a display position other than a display position specified by the display position specification information or not is added to the display position specification information.

(7) The transmitting apparatus according to any of (1) to (6), wherein
the container transmitted by the transmitting unit further includes a subtitle stream obtained by coding subtitle data, and
the information inserting unit is configured to further insert display position specification information into the layer of the container, the display position specification information specifying a display position of a subtitle by the subtitle data.

(8) The transmitting apparatus according to any of (1) to (7), wherein
a container transmitted by the transmitting unit further includes electronic program guide information, and
the information inserting unit is configured to further insert display position specification information into the layer of the container, the display position specification information specifying a display position of a program guide by the electronic program guide information.

(9) The transmitting apparatus according to any of (1) to (8), wherein
the container is a transport stream, and
the information inserting unit is configured to insert the display position specification information into a descriptor under a video elementary loop of a program map table included in the transport stream.

(10) A transmitting method including:
a step of transmitting a container in a predetermined format, the container including a video stream obtained by coding image data; and
a step of inserting display position specification information into a layer of the container, the display position specification information specifying a display position of an image by the image data.

(11) A receiving apparatus including:
a receiving unit configured to receive a container in a predetermined format, the container including a video stream obtained by coding image data, wherein
display position specification information specifying a display position of an image by the image data is inserted into a layer of the container, and
the receiving apparatus further includes a display control unit configured to control a process of the video stream to display the image by the image data at a display position specified by the display position specification information.

(12) The receiving apparatus according to (11) further including:
a decoding unit configured to decode the video stream to obtain non-compressed image data; and
a transmitting unit configured to transmit the non-compressed image data to a display apparatus by a control by the display control unit, the display apparatus having a display target screen specified by the display position specification information, wherein
the transmitting unit is configured to insert a time code into header information at each frame of the non-compressed image data, the time code being configured to perform counting in units of frames.

(13) The receiving apparatus according to (11) or (12), further including:
a transmitting unit configured to transmit the container to a display apparatus by a control by the display control unit, the display apparatus having a display target screen specified by the display position specification information.

(14) A receiving method including:
a step of receiving a container in a predetermined format, the container including a video stream obtained by coding image data, wherein
display position specification information specifying a display position of an image by the image data is inserted into a layer of the container, and
the receiving method further includes a step of controlling a process of the video stream to display the image by the image data at a display position specified by the display position specification information.

(15) A receiving display method including:
receiving a container in a predetermined format, the container including a video stream obtained by coding image data, wherein
display position specification information specifying a display position of an image by the image data is inserted into a layer of the container, and
the receiving display method arranges the image by the image data at: a display position specified by the display position specification information, or a display position different from the display position specified by the display position specification information, by determination based on determination information including at least the display position specification information.

(16) The receiving display method according to (15), wherein
the determination information further includes display position change information by a user operation.

(17) The receiving display method according to (16), wherein
information indicative of whether to permit a display at a display position other than a display position specified by the display position specification information or not is added to the display position specification information, and
the determination information further includes the additional information.

The main feature of this technique inserts the display position specification information (stream_screen_id and window_id), such as the image and the graphics (including the subtitle), into the layers of the container such as the transport stream TS to allow the transmitting side to actively control the display position of the image, the graphics, or similar data (see FIG. 5).

REFERENCE SIGNS LIST 10, 10A to 10C image transmission/reception system
100 transmitting apparatus
110 transmission data generator
111-1 to 111-N image data output unit
112-1 to 112-N video encoder
113 graphics data output unit
114 graphics encoder
115 multiplexer
200, 200A, 200B receiving apparatus
201 receiving unit 202, 202A demultiplexer
203 display control unit
204-1 to 204-M information processor
204a decoder
204b scaler
205 user operating unit
206 re-multiplexer
300, 300-1 to 300-M screen device
400-1 to 400-M, 400C display apparatus
401 demultiplexer
402 decoder
403 scaler
404 display control unit

The invention claimed is:

1. A receiving apparatus comprising:
circuitry configured to
receive a container in a format, the container including a plurality of video streams obtained by coding image data,
receive display position specification information specifying a display position of an image by the image data, the display position specification information being inserted into a layer of the container for each of the plurality of video streams and including information specifying a display position for said each of the plurality of video streams and a flag indicating whether or not the receiving apparatus can set the display position for said each of the plurality of video streams to be a display position different from the display position specified by the display position specification information,
when the flag indicates that the receiving apparatus can set the display position for said each of the plurality of video streams to be the display position different from the display position specified by the display position specification information, control a process of the plurality of video streams to permit a change in a display the image by the image data of said each of the plurality of video streams to be at the display position different from the display position specified by the display position specification information for said each of the plurality of video streams, and
when the flag indicates that the receiving apparatus cannot set the display position for said each of the plurality of video streams to be the display position different from the display position specified by the display position specification information, control the process of the plurality of video streams to display the image by the image data of said each of the plurality of video streams at the display position specified by the display position specification information for said each of the plurality of video streams.

2. The receiving apparatus according to claim 1, wherein the circuitry is further configured to
decode the plurality of video streams to obtain non-compressed image data;
transmit the non-compressed image data to a display apparatus, the display apparatus having a plurality of display target screens specified by the display position specification information; and
insert a time code into header information at each frame of the non-compressed image data, the time code being configured to perform counting in units of frames.

3. The receiving apparatus according to claim 1, wherein the circuitry is further configured to transmit the container to a display apparatus, the display apparatus having a plurality of display target screens specified by the display position specification information.

4. The receiving apparatus according to claim 1, wherein the display specification information includes at least one identifier that is a screen identifier or a window identifier.

5. The receiving apparatus according to claim 1, wherein the plurality of streams include at least one subtitle stream and at least one video stream, the at least one subtitle stream being associated with a specific display position specification information identifier.

6. The receiving apparatus according to claim 1, wherein a program guide information is inserted into one of the plurality of streams, and
the stream including the program guide information is associated with a specific display position specification information identifier.

7. The receiving apparatus according to claim 1, further comprising a display configured to display contents associated with at least two different streams from among the plurality of video streams in an identical display area, the at least two different streams each including a display position specification information associated with the display area.

8. The receiving apparatus according to claim 1, further comprising a display screen.

9. The receiving apparatus according to claim 1, wherein, when the display position specification information for at least one of the plurality of video streams changes, the circuitry is configured to control the process of the plurality of video streams to display the image by the image data of said at least one of the plurality of video streams at the display position specified by the changed display position specification information for said at least one of the plurality of video streams.

10. A receiving method comprising:
receiving a container in a format, the container including a plurality of video streams obtained by coding image data,
receiving display position specification information specifying a display position of an image by the image data, the display position specification information being inserted into a layer of the container for each of the plurality of video streams and including information specifying a display position for said each of the plurality of video streams and a flag indicating whether or not the receiving apparatus can set the display position for said each of the plurality of video streams to be a display position different from the display position specified by the display position specification information,
when the flag indicates that the receiving apparatus can set the display position for said each of the plurality of video streams to be the display position different from the display position specified by the display position specification information, controlling a process of the plurality of video streams to permit a change in a display the image by the image data of said each of the plurality of video streams to be at the display position different from the display position specified by the display position specification information for said each of the plurality of video streams, and
when the flag indicates that the receiving apparatus cannot set the display position for said each of the plurality of video streams to be the display position different from the display position specified by the display position specification information, controlling the process of the plurality of video streams to display the image by the image data of said each of the plurality of video streams at the display position specified by the display position specification information for said each of the plurality of video streams.

11. A receiving display method comprising:
receiving a container in a format, the container including a plurality of video streams obtained by coding image data,
receiving display position specification information specifying a display position of an image by the image data, the display position specification information being inserted into a layer of the container for each of the plurality of video streams and including information specifying a display position for said each of the plurality of video streams and a flag indicating whether or not the receiving apparatus can set the display position for said each of the plurality of video streams to be a display position different from the display position specified by the display position specification information,
when the flag indicates that the receiving apparatus can set the display position for said each of the plurality of video streams to be the display position different from the display position specified by the display position specification information, arranging the image by the image data of said each of the plurality of video streams at the display position specified by the display position specification information for said each of the plurality of video streams, or the display position different from the display position specified by the display position specification information for said each of the plurality of video streams, by determination based on determination information including at least the display position specification information for said each of the plurality of video streams, and
when the flag indicates that the receiving apparatus cannot set the display position for said each of the plurality of video streams to be the display position different from the display position specified by the display position specification information, arranging the image by the image data of said each of the plurality of video streams at the display position specified by the display position specification information for said each of the plurality of video streams.

12. The receiving display method according to claim 11, wherein
the determination information further includes display position change information by a user operation.

13. A receiving display apparatus comprising:
circuitry configured to
receive a container in a format, the container including a plurality of video streams obtained by coding image data,
receive display position specification information specifying a display position of an image by the image data, the display position specification information being inserted into a layer of the container for each of the plurality of video streams and including information specifying a display position for said each of the plurality of video streams and a flag indicating whether or not the receiving apparatus can set the display position for said each of the plurality of video streams to be a display position different from the display position specified by the display position specification information,
when the flag indicates that the receiving apparatus can set the display position for said each of the plurality of video streams to be the display position different from the display position specified by the display position specification information, arrange the image by the image data of said each of the plurality of video streams at the display position specified by the display position specification information for said each of the plurality of video streams, or the display position different from the display position specified by the display position specification information for said each of the plurality of video streams, by determination based on determination information including at least the display position specification information for said each of the plurality of video streams, and
when the flag indicates that the receiving apparatus cannot set the display position for said each of the plurality of video streams to be the display position different from the display position specified by the display position specification information, arranging the image by the image data of said each of the plurality of video streams at the display position specified by the display position specification information for said each of the plurality of video streams.

14. The receiving display apparatus according to claim 13, wherein
the determination information further includes display position change information by a user operation.

* * * * *